(12) United States Patent
Lurey et al.

(10) Patent No.: US 8,738,934 B2
(45) Date of Patent: May 27, 2014

(54) METHOD AND APPARATUS FOR PROTECTING ACCOUNT NUMBERS AND PASSWORDS

(75) Inventors: Craig B. Lurey, El Dorado Hills, CA (US); Darren S. Guccione, Wheaton, IL (US)

(73) Assignee: Keeper Security, Inc., Chicago, IL (US)

( * ) Notice: Subject to any disclaimer, the term of this patent is extended or adjusted under 35 U.S.C. 154(b) by 601 days.

(21) Appl. No.: 12/868,722

(22) Filed: Aug. 26, 2010

(65) Prior Publication Data
US 2011/0055593 A1 Mar. 3, 2011

Related U.S. Application Data

(63) Continuation-in-part of application No. 12/546,881, filed on Aug. 25, 2009, now Pat. No. 8,656,504.

(51) Int. Cl.
| | | |
|---|---|---|
| *G06F 21/00* | (2013.01) | |
| *G06F 21/12* | (2013.01) | |
| G06F 21/31 | (2013.01) | |
| G06F 21/62 | (2013.01) | |

(52) U.S. Cl.
CPC ...... *G06F 21/123* (2013.01); *G06F 2221/2107* (2013.01); *G06F 2221/2141* (2013.01); *G06F 21/31* (2013.01); *G06F 21/6218* (2013.01); *G06F 21/6245* (2013.01); *G06F 2221/2111* (2013.01)
USPC .............................................. 713/193; 726/27

(58) Field of Classification Search
CPC ....... G06F 21/123; G06F 21/31; G06F 21/60; G06F 21/6218; G06F 21/6245; G06F 2221/2107; G06F 2221/2141; G06F 2221/2111
USPC .............................................. 713/193; 726/27
See application file for complete search history.

(56) References Cited

U.S. PATENT DOCUMENTS

| | | | | |
|---|---|---|---|---|
| 6,732,278 | B2 * | 5/2004 | Baird et al. | 726/7 |
| 2002/0016912 | A1 * | 2/2002 | Johnson | 713/165 |
| 2002/0051540 | A1 * | 5/2002 | Glick et al. | 380/258 |
| 2005/0251491 | A1 | 11/2005 | Medina et al. | |
| 2005/0257057 | A1 | 11/2005 | Ivanov et al. | |
| 2007/0061266 | A1 | 3/2007 | Moore et al. | |

(Continued)

FOREIGN PATENT DOCUMENTS

JP 10-336167 * 12/1998

OTHER PUBLICATIONS

Jeff Saporito, "Callpod Keeper Desktop", testfreaks blog, Jul. 31, 2009 http://blog.testfreaks.com/review/callpod-keeper-desktop/.*

(Continued)

*Primary Examiner* — Jung Kim
*Assistant Examiner* — Carlos M De Jesus Lassaia
(74) *Attorney, Agent, or Firm* — Blanchard & Associates

(57) ABSTRACT

A method and apparatus are provided for protecting confidential information. The method includes the steps of providing a plurality of files where each file contains at least one item of secret information, such as a password for a private account. Access to the plurality of files is password protected with a master password. To access the plurality of files, the master password must be entered into a master password entry field. The files are deleted upon successive entry of incorrect passwords into the master password entry field a predetermined number of times.

22 Claims, 17 Drawing Sheets

(56) References Cited

U.S. PATENT DOCUMENTS

| | | | |
|---|---|---|---|
| 2008/0060052 A1 | 3/2008 | Hwang et al. | |
| 2008/0065729 A1* | 3/2008 | Haas | 709/206 |
| 2008/0066020 A1* | 3/2008 | Boss et al. | 715/968 |
| 2009/0044025 A1* | 2/2009 | She | 713/193 |
| 2009/0046858 A1 | 2/2009 | Iyer et al. | |

OTHER PUBLICATIONS

Jerry Bradenbaugh, "JavaScript Application Cookbook", O'Reilly Online catalog, Sep. 1999, http://web.archive.org/web/20000823053228/http://www.oreilly.com/catalog/jscook/chapter/ch09.html.*

Mita et al. "machine translation of JP 10-336167" http://dossier1.ipdl.inpit.go.jp/AIPN/odse_call_transl.ipdl?N0000=7413&N0005=Ei7BzenZVnBvfz7D1ZIK&N0120=01&N2001=2&N3001=h10-336167&Ntt3=&Ntt4=&Ntt5=&Ntt6=&Ntt7=&Ntt8=&Ntt9=&Ntt10=&Ntt11=&Ntt12=.*

Michael Alexander, "Keeper: Encrypt the Data on Your iPhone", AppCraver, Feb. 24, 2009, http://www.appcraver.com/keeper/.*

Jerry Bradenbaugh, "JavaScript Application Cookbook", O'Reilly Online catalog, Sep. 1999, http://web.archive.org/web/20000823053228/http ://www.oreilly.com/catalog/jsoock/chapter/ch09.html.*

Mita et al. "machine translation of JP 10-336167" http://dossier1.ipdl.inpit.go.jp/AIPN/odse call transl.ipdl?N0000=7413 &N0005=Ei7BzenZVnBvfz7D1ZI K&N0120=01 &N2001 =2& N3001 =h 10-336167&Ntt3=&Ntt4=&Ntt5=&Ntt6=&Ntt7= &Ntt8=&Ntt9=&Ntt 10=&Nttl 1 =&Ntt 12=.*

Ascendo et al. "Ascendo DataVault—BlackBerry Passwprd Manager Version 4 user guide" Oct. 2007, http://web,archive.org/web/20071020175341/http://ascendo-inc.com/UserGuides/DV/DV4UGContents.html.*

KeePass et al. "PasswordsRevisited-Using KeePass to Manage Your Financial Account Infomation" May 12, 2008, pp. 1-8, http://interesting money.com/2008/05/12/passwords-revisited-using-keepass-to-manage-your-financial-account-information/.*

Beeken et al. "Password Manager: KeePass Password Safe Review" Feb. 17, 2008, pp. 1-7 http://jlog.jgen.ws/organize/keepass/.*

AppDigity et al. "Keeper Password & Data Vault" Aug. 14, 2008, pp. 1-3 http://www.appdigity.com/pages/view_app.php?app_id=255.*

Search Report and Written Opinion for International Application No. PCT/US2010/046715 mailed Oct. 14, 2010, 13 pages.

* cited by examiner

400

500

600

2030

2034

2036

METHOD AND APPARATUS FOR PROTECTING ACCOUNT NUMBERS AND PASSWORDS

CROSS REFERENCE TO RELATED APPLICATIONS

This application is a continuation-in-part of application Ser. No. 12/546,881, filed Aug. 25, 2009, which is incorporated by reference herein in its entirety.

BACKGROUND

1. Field of the Invention

The field of the invention relates to portable electronic devices and more particularly to the security of information kept within portable devices.

2. Background of the Invention

Fraud prevention methods are well known. In the past, methods of fraud prevention were based upon a personal relationship among transaction partners. Merchants knew their customers and would not be fooled by someone else asking for access to customer accounts.

In today's environment, merchants and account managers do not personally know their customers. As such, access to accounts is typically based upon at least two levels of security. On the first level, a user is required to have some form of identification (e.g., a credit or debit card, an account number, etc.). The second level of security is usually a password.

The first level of security is often manifested in a hard-coded format (e.g., a plastic card) that could be lost or stolen. On the other hand, the second level of security (i.e., passwords) are often committed to memory. As long as a person's password is committed to memory, a lost or stolen credit card is useless.

However, many people often forget their passwords. As a consequence, some people will write their passwords down and carry the passwords with them in their purse or wallet. In this case, if the user loses their purse or wallet, then a thief may still be able to access the accounts of the account holder.

In order to counteract the problem of compromised passwords, many organizations will often request personal information from users (e.g., mother's maiden name, high school mascot, name of first employer, etc.). In addition, to requiring an account number and passwords, many organizations often request an item of personal information on a random basis.

While adding another level of security further increases security, the additional level further increases the difficulty in providing the information of the various levels of security, especially where the memory of a user is impaired. This problem is made worse when a user has accounts with many different organizations. Accordingly, a need exists for better methods of providing the information required for the various levels of security.

SUMMARY OF THE INVENTION

According to some aspects, a method and apparatus are provided for protecting confidential information. The method includes the steps of providing a plurality of files where each file contains at least one item of secret information, password protecting the plurality of files with a master password, detecting entry of passwords into a master password entry field, comparing entered passwords with the master password to identify incorrect master passwords and deleting the plurality of files upon successive entry of incorrect master passwords a predetermined number of times.

According to another aspect, a method for protecting confidential information on an electronic memory device includes the steps of collecting a plurality of files on an electronic memory device, wherein each file contains at least one item of secret information; encrypting the plurality of files with a master password; creating a cryptographic hash from the master password and storing the cryptographic hash with the files; entering an entry password into a master password entry field; creating a second cryptographic hash from the entered password; identifying the entered password as an incorrect password by comparing the second cryptographic hash and the first cryptographic hash; and deleting the plurality of files upon successive entry of incorrect entered passwords a predetermined number of times.

According to a further aspect, a method implemented by a programmed processor coupled to a display includes the steps of causing the display to present a first screen including a first key, a second key, and a plurality of third keys, wherein each third key represents an associated one of a plurality of stored files wherein at least one file includes title information and an item of confidential information comprising access protected account information and an access password for accessing the account information; causing the display to present a second screen in response to actuation of the first key of the first screen wherein the second screen includes a first blank field for receiving additional title information, a second blank field for receiving an item of additional confidential information related to the additional title information, and a fourth key; storing the additional title information and the additional confidential information as an additional file in response to actuation of the fourth key of the second screen; causing the display to present a third screen in response to actuation of a selected one of the third keys and the second key of the first screen wherein the third screen includes editable fields containing the title information and the item of confidential information of a particular stored file associated with the selected third key, and wherein the third screen includes a fifth key; storing contents of the editable fields in the particular stored file in response to actuation of the fifth key; and password protecting access to the stored files with a master password.

According to yet another aspect, an apparatus includes at least one storage device that stores a plurality of files wherein each file contains at least one item of confidential information and wherein a geographic location of use is associated with the file; a position comparison processor coupled to the at least one storage device that compares a current geographic location with each of the geographic locations of use associated with the plurality of files; and a display coupled to the position comparison processor that displays contents of a selected file, wherein the geographic location of use associated with the selected file matches the current geographic location.

According to other aspects, an apparatus includes a display; means for causing the display to present a first screen including a first key, a second key, and a plurality of third keys, wherein each third key represents an associated one of a plurality of stored files wherein each file includes title information and an item of confidential information; means for causing the display to present a second screen in response to actuation of the first key of the first screen wherein the second screen includes a first blank field for receiving additional title information, a second blank field for receiving an item of additional confidential information related to the additional title information, and a fourth key; means for storing the additional title information and the additional confidential information as an additional file in response to actuation of the fourth key of the second screen; means for causing the display to present a third screen in response to actuation of a selected one of the third keys and the second screen of the first screen wherein the third screen includes editable fields containing the title information and the item of confidential information of a particular stored file associated with the selected third key, and wherein the third screen includes a fifth key; means for storing contents of the editable fields in the particular stored subject matter file in response to actuation of the fifth key; and means for password protecting access to the files.

Other aspects of the inventions will be apparent upon review of the disclosure contained herein.

DETAILED DESCRIPTION OF AN ILLUSTRATED EMBODIMENT

Figure 1:
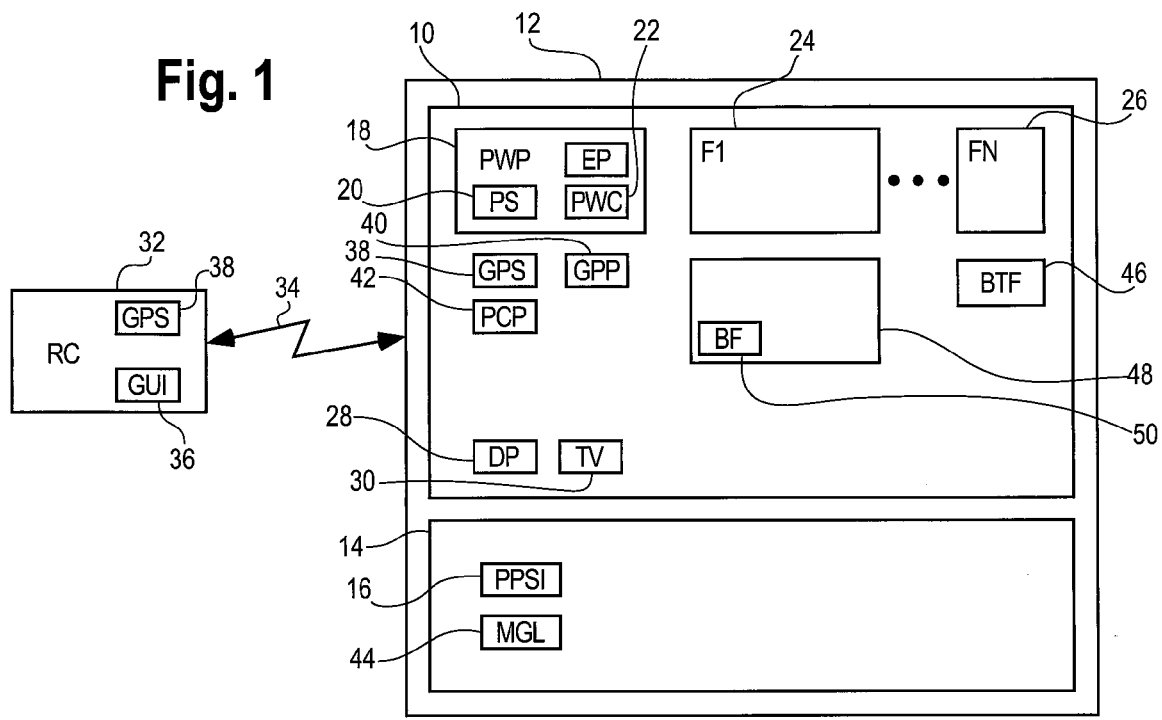
FIG. 1 is a block diagram of a password protection system 10 shown in a context of use generally in accordance with an illustrated embodiment of the invention.

FIG. 1 is a block diagram of a password protection system 10 shown within a context of use generally in accordance with an illustrated embodiment of the invention. The password protection system 10 may be used in conjunction with any of a number of portable electronic devices (e.g., an iPhone, PDA, portable computer, desktop computer etc.) 12 for convenient access to personal information in a safe, secure, portable environment.

Under the illustrated embodiment, a separate subject matter file may be created within the password protection system 10 for each unit of confidential information. For example, a first file may be provided for a VISA credit card, a second file may be provided for a MASTERCARD, a third file may be provided for bank or brokerage accounts, etc. Moreover, each file is not limited in the amount of information that may be used to define the unit of information.

Each file within the password protection system may be identified by a convenient title. In most cases, the title may be selected to be suggestive of the subject matter of the file. For example, a VISA file may be entitled "VISA."

Another file may be entitled "mortgages" as an indication of content. Within the file may be a name and account number of a mortgage holder. Alternatively, the content of the file may be a list of mortgage holders where a content of the list operate as pointers to other files that contain the specific account information of the mortgage holders in the list.

Moreover, the information contained within the password protection system 10 is intended to be automatically deleted upon the occurrence of any of a number of predetermined events. For example, entry of a sequence of incorrect passwords into the field intended for entry of a master password may cause deletion of all of the data within the password protection system 10 when the number of incorrect passwords in the sequence exceeds some predetermined value. Similarly, any attempt to copy the password protection system 10 or the encrypted files of the password protection system 10 may also automatically cause deletion.

Under another illustrated embodiment, the password protection system 10 may automatically offer information based upon geographic location. In this case, a user of the device 12 may mark certain geographic locations where certain units of confidential information are typically used. The next time that the user logs into the password protection system 10 at the marked location, the password protection system 10 automatically offers access to the marked information that corresponds to that geographic location.

The password protection system 10 may be used as an auxiliary application on any of a number of electronic devices 12 or as a single application on a stand-alone portable electronic device. For example, the password protection system 10 could be used as an application on an iPhone.

While the password protection system may have its greatest utility in small portable devices, the password protection system 10 may also be used in laptops and other desktop computer devices. For simplicity, the system 10 will first be described in the context of a laptop or desktop computer 12.

Figure 2:
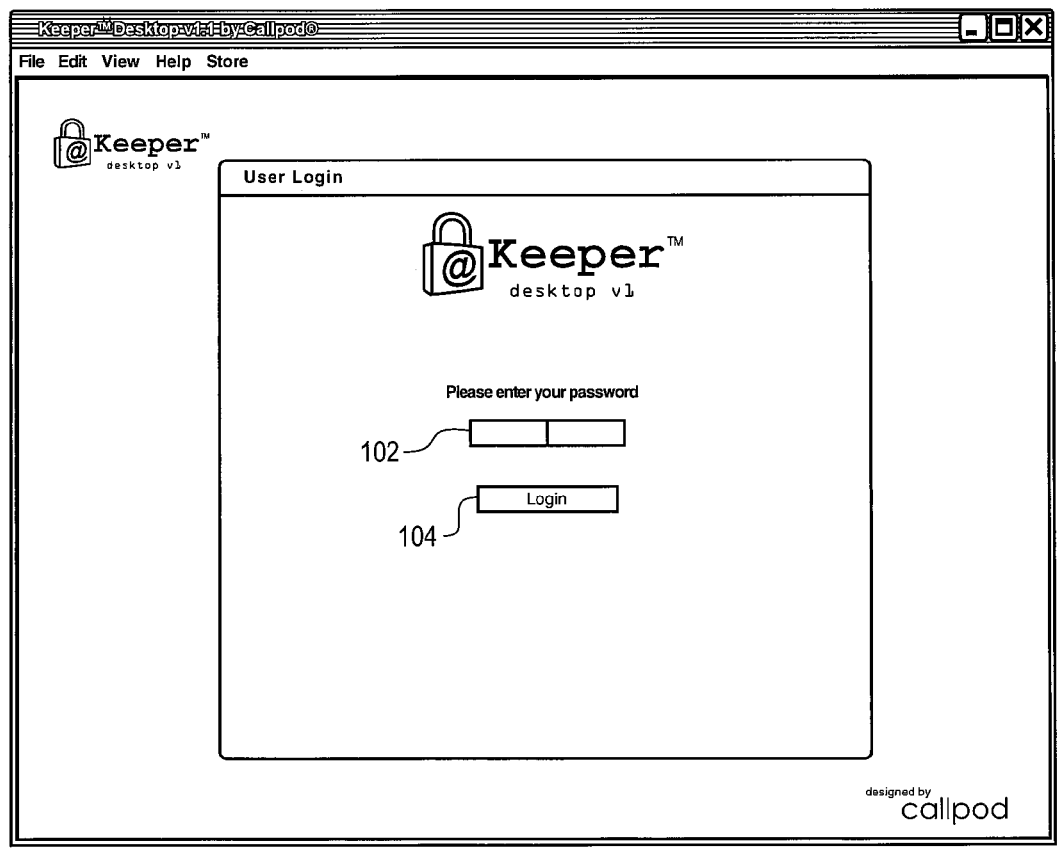
FIG. 2 is a master password entry screen that may be used by the system of FIG. 1.

In order to access the system 10, an access icon 16 of the password protection system 10 may be provided on a display 14 of the device 12. Upon selection of the icon 16, a sign on or login screen 100 (FIG. 2) may be presented to the user. Included within the sign on screen may be an interactive window 102 for entry of a master password. As used herein, a master password is an alphanumeric string used for gaining global access to the password protection system 10.

The master password may be any length up to 32 characters or longer in some cases. Any combination of letters or numbers may be combined depending upon the level of security needed.

Once presented with the interactive window for the master password, a user may enter the master password and activate an ENTER or LOGIN softkey 104. In response, a password processor 18 may compare the entered password with a previously saved master password 20.

If the password entered through the master password window 102 matches the saved master password 20, then access is granted to the subject matter files 24, 26 of the password protection system 10. For example, the window 200 of FIG. 3 may be presented to the user showing a list of titles 202.

On the other hand, if the entered password does not match the saved master password 20, then the password processor 18 increments a master password sequence counter or count register 22. Each time the entered password matches the saved master password 20, the password processor 18 resets (i.e., enters a zero value into) the master password sequence count register 22.

After each incorrect master password, the password processor 18 compares the value within the sequence count register 22 with a threshold value (e.g., a value of 5) 30. If the value within the count register 22 exceeds the threshold value 30, then the password processor 18 may activate a deletion processor 28. The deletion processor automatically and completely deletes each of the subject matter files 24, 26.

It should be specifically noted that the password protection system 10 does not provide any method for recovering or resetting forgotten master passwords. Moreover, if an unauthorized party should attempt to guess a password or use some computer controlled algorithm to match the master password, the automatic deletion of the subject matter files will defeat such attempt after a very limited number of tries.

Information saved within the system 10 may be encrypted using a public key and military specified encryption algorithm. In this regard, the public key and encryption algorithm operate on substantially all of the data within the system 10. On a first level, the master password is encrypted using the public key and encryption algorithm. Passwords entered through the password window 102 are encrypted and compared with the previously encrypted master password 20 during login. On another level, the subject matter files 24, 26 are further encrypted using the encrypted master password 20.

In a preferred embodiment, the password protection system 10 is protected by a one-way encryption system that encrypts the files with the master password and creates a first cryptographic hash from the master password and stores the first cryptographic hash with the files. A cryptographic hash function, such as MD5, may be used. The master password itself is not stored within the password protection system 10, but rather the first cryptographic hash is stored with the password protection system 10. To open the password protection system 10, an entry password is entered from which a second cryptographic hash is created using the same cryptographic hash function. If the first cryptographic hash and the second cryptographic hash match, then the user is allowed access into, or opens, the password protection system 10 and the entered (master) password is used to decrypt the individual files. The entered password is used as a symmetric key to decrypt the individual files. If the first cryptographic hash and the second cryptographic hash do not match (i.e., identifying the entered password as incorrect), and a predefined number of incorrect entry passwords are entered in succession, then the password protection system 10 automatically deletes all of the files.

Once a user opens the password protection system 10, the password processor decrypts the files 24, 26 and the user is presented with a navigation screen 200 containing the list of titles (alphanumeric sequences) 202 where each title corresponds to a respective file 24, 26. Each title of the list 202 presented on the navigation screen 200 operates as an access softkey for accessing a corresponding respective file 24, 26.

As opposed to scrolling through the list 202, the user may also search the files 24, 26. Included on the navigation screen may be an interactive window 204 for entering a search term. In this regard, the name and content of the files 24, 26 may be searchable. For example, if a user wishes to know if he/she has used the same term (e.g., title, password, etc.) for any other file, the user may enter the term, activate the ENTER button and the password system 10 will return an indication of any other files in which the term has been used.

Alternatively, the user may be provided with a "sort by" menu softkey 206. In this case, if the user selects "Sort by Title" and enters a letter, then the system 10 will return an alphabetic list of files 24, 26 that have a title beginning with the entered letter. Alternatively, the user may sort by oldest or youngest file 24, 26.

Associated with each of the files 24, 26 may be a number of information fields 208, 210, 212, 214 defined according to function. If the user wishes to retrieve a particular file 24, 26, then the user may select the corresponding title (e.g., title 302 in FIG. 4) from the list 202. Upon selection of the title 302, the user is presented with the information within each of the fields 208, 210, 212, 214.

Figure 4:
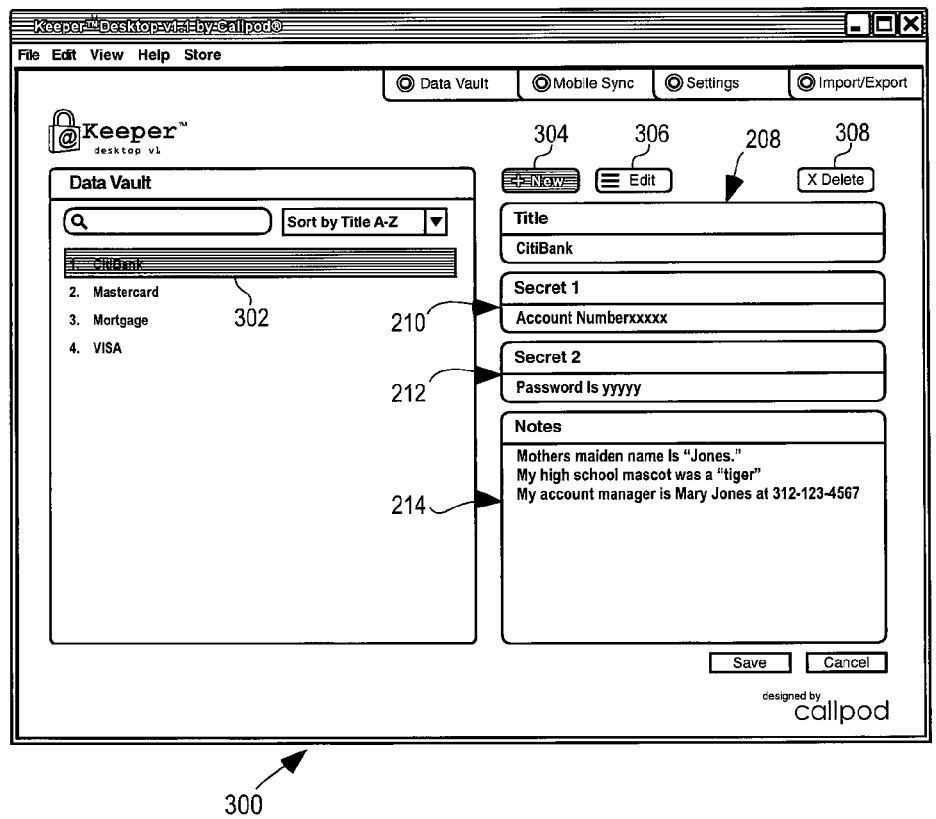
FIG. 4 is confidential information for a title selected by a user from the screen of FIG. 3.

In the example shown in FIG. 4, the user has selected the title "CitiBank" 302. In this case, the file 24, 26 contains information regarding a bank account with CitiBank. The title "CitiBank" is shown in the first field 208, the account number "xxxxx" is shown in the second field 210 as the first secret item, the password "yyyyy" is shown as the second secret item in the third field 212.

Also shown in FIG. 4 is a fourth field 214 labeled "Notes." Within the Notes field 214, the user may enter any information used in conjunction with the account. In this case, the user may enter the answers to the personal questions asked by the bank in setting up the account. In this case, the answers to the personal questions may be used by the bank to confirm the identity of the user in any of a variety of different situations (e.g., on-line transactions, telephone requests, etc.).

In addition to retrieving information, the user can also easily modify the records 24, 26 within the system 10. For example, if the user should want to change a password saved in the second field or window 212 of the screen 300, then the user may activate an Edit softkey 306. Once the Edit softkey 306 has been activated, the user can place a cursor over the information of the fields 208, 210, 212, 214 and enter changes.

Similarly, if the user should wish to create an entry for a new account (i.e., create a new file 24, 26), the user may activate the New softkey 304. Once the New softkey 304 is activated, the user can add files 24, 26 as necessary by typing a title into the first window 208 followed by additional information into the following windows 210, 212, 214.

If the user should find that certain information has become outdated or may be replaced by other information, the user can delete the appropriate files 24, 26. In this case, the user simply selects the title of a file 24, 26 and activates the Delete softkey 308.

Figure 3:
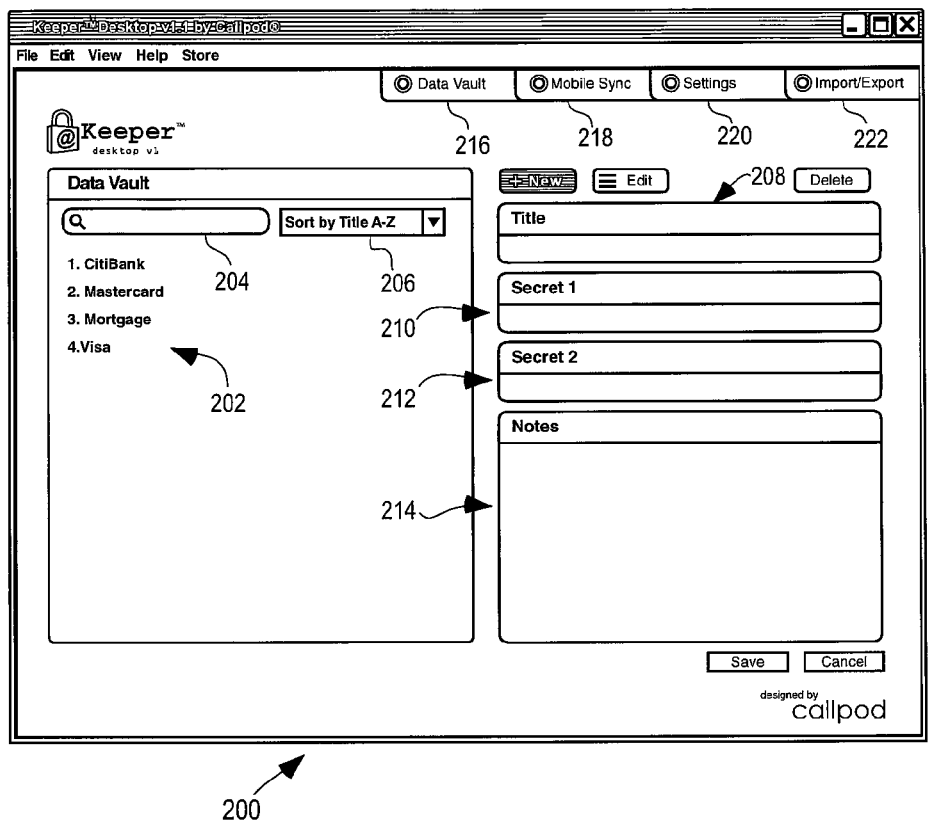
FIG. 3 is a title selection list screen of confidential information that may be displayed by the system of FIG. 1.

Similarly, the system 10 can be adapted to any of a number of different uses. For example, if the user should wish to change the user interface of the system 10, then the user may activate the Settings softkey 220 (FIG. 3).

Figure 5:
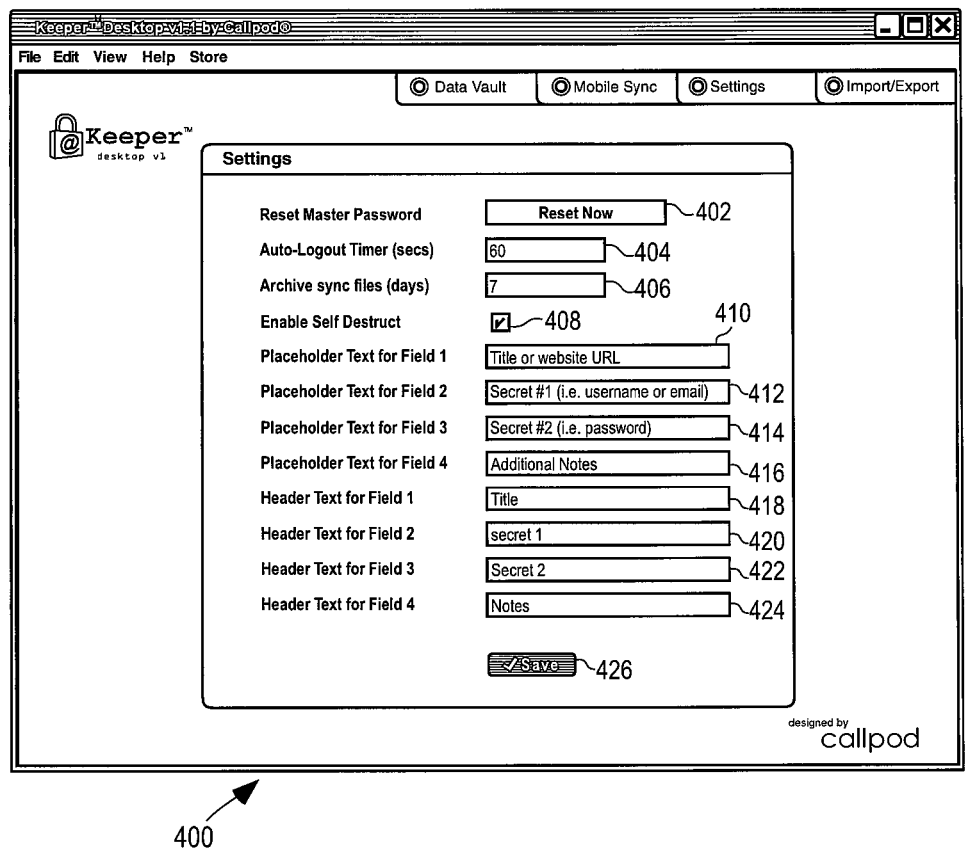
FIG. 5 is a settings screen that may be selected by a user through the screens of FIG. 3 or 4.

Upon activating the Settings softkey 220, the user is presented with the settings screen 400 of FIG. 5. A first choice of the settings screen 400 is a Reset Master Password softkey 402. The Reset softkey 402 resets the master password 20.

In order to reset the master password 20, the password processor 18 first decrypts each of the files 24, 26 using the old encrypted master password 20. The password processor 18 then requires that the user enter a new master password a first and then a second time. If the two newly entered passwords match then the password processor first encrypts the new master password 20 and then re-encrypts each of the files 24, 26.

Another choice on the setting screen 400 is a window 404 for entering a time delay controlling automatic logout. In this case, a timer within the system 10 is initiated each time the user logs in. When the timer reaches the time value shown in the window 404 (or reaches zero from a starting value equal to the time shown in the window 404), the system 10 automatically logs the user out of the system 10. The logout in this case may be set to a relatively short period of time to further protect the files 24, 26 by automatically requiring the user to re-enter the master password each time the time period 404 elapses.

Another choice on the settings screen 400 is a window 406 for specifying a time interval for backing up or otherwise archiving the files 24, 26 in a memory device. In this case, the specified time is in days. After the expiration of the time period specified in the window 406, the user is prompted to synchronize the files 24, 26.

Another choice on the settings screen 400 is a box 408 for enabling or disabling the automatic deletion of the files 24, 26. If the box 408 is checked, then after a specified sequence of incorrect master passwords are entered, the files 24, 26 are automatically deleted. If the box 408 is not checked, then the system 10 will not delete the files 24, 26. However, the system 10 will continue to deny access until the proper master password is entered.

Other choices include a number of windows 410, 412, 414, 416, 418, 420, 422, 424 that may be used in conjunction with the New softkey 304 and with the creation of new files 24, 26. For example, boxes 418, 420, 422, 424 are used for entering the terms that will appear in the upper halves of fields 208, 210, 212, 214. Boxes 410, 412, 414, 416 are used for entry of placeholder terms that are initially displayed in the lower halves of fields 208, 210, 212, 214 and that are replaced with the actual information entered by the user. For example, a first box 418 may be used for entry of header text (e.g., the word "title") or other descriptive term in the upper portion of field 208 for each of the files 24, 26. In the example, of FIG. 5, the placeholder for the header text entered through box 410 is descriptive of the format of the header text, including an identifier of a bank or credit account or the name of a website.

Similarly, a second box 420 and third box 422 may be used for entry of descriptive header text displayed in the top halves of the second and third fields 210, 212, respectively, while boxes 412, 414 receive descriptive placeholder information of the format of user information that may be entered into the lower halves of the second and third fields 210, 212. For example, box 420 may have the title of "secret 1" in the top half of field 210 while the placeholder entered through box 412 may be "Secret #1 (i.e., username or email)." Similarly, box 422 may have the title of "secret 2" in the top half of field 212 while the placeholder entered through box 414 may be "Secret #2 (i.e., password)." Box 424 may have the header text of "Notes" in the top half of field 214 while the placeholder entered through box 416 may be "Additional Notes." The user may make whatever setting changes desired and activate a Save softkey 426 to save the desired settings.

Figure 6:
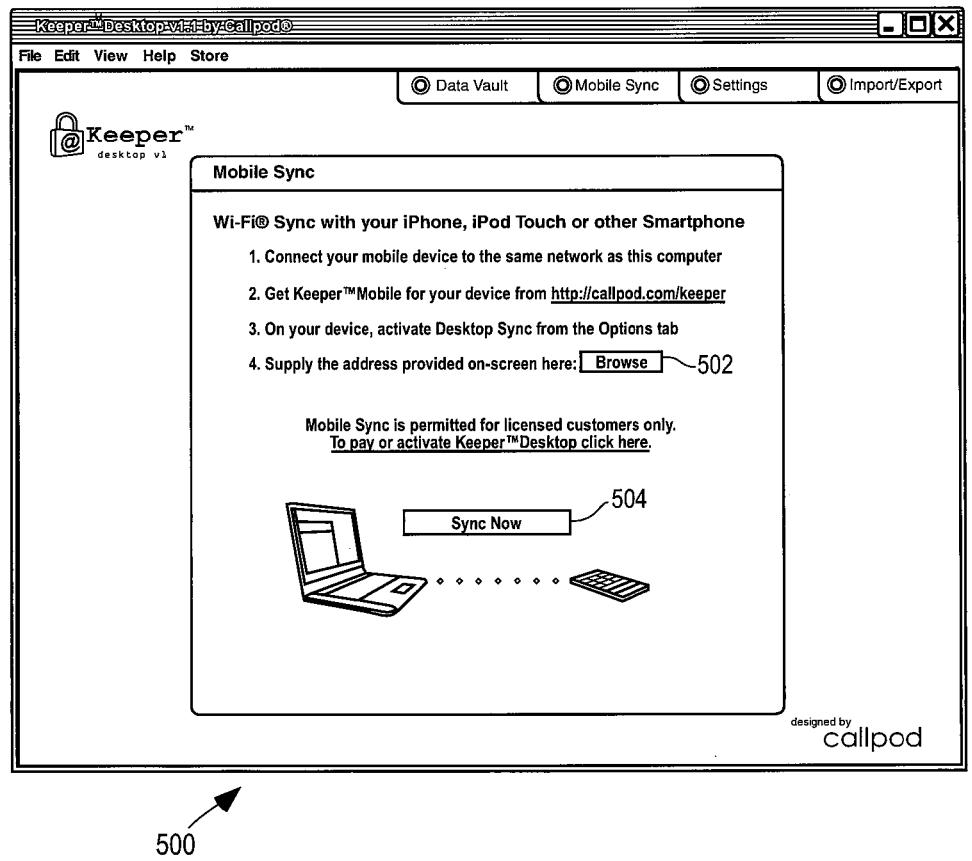
FIG. 6 is a synchronization screen that may be selected by a user through the screens of FIGS. 3-5.

If the user should select the Mobile Sync softkey 218 (FIG. 3), then the user may be presented with the screen 500 of FIG. 6. The Mobile Sync softkey 218 operates to synchronize data or otherwise exchange updates between the laptop 12 and mobile device 32.

In order to synchronize data, the user first provides an appropriate software version of the system 10 to the mobile device 32 and connects the mobile device 32 to the same network as the laptop 12. In this regard, the connection may be established via any appropriate medium (e.g., WiFi, USB cable, Bluetooth, etc.). In the example of FIG. 1, the laptop 12 is connected to the mobile device 32 via a WiFi connection 34.

To initiate synchronization, the user activates Mobile Sync softkey 218 (if not already activated). From the screen 500, the user may select the communication system via a Browse softkey 502. In the example of FIG. 1, the user would select the WiFi connection 32. Once the communication connection 34 has been selected, the user activates the Sync Now softkey 504 to synchronize files 24, 26 among devices 12, 32.

Figure 7:
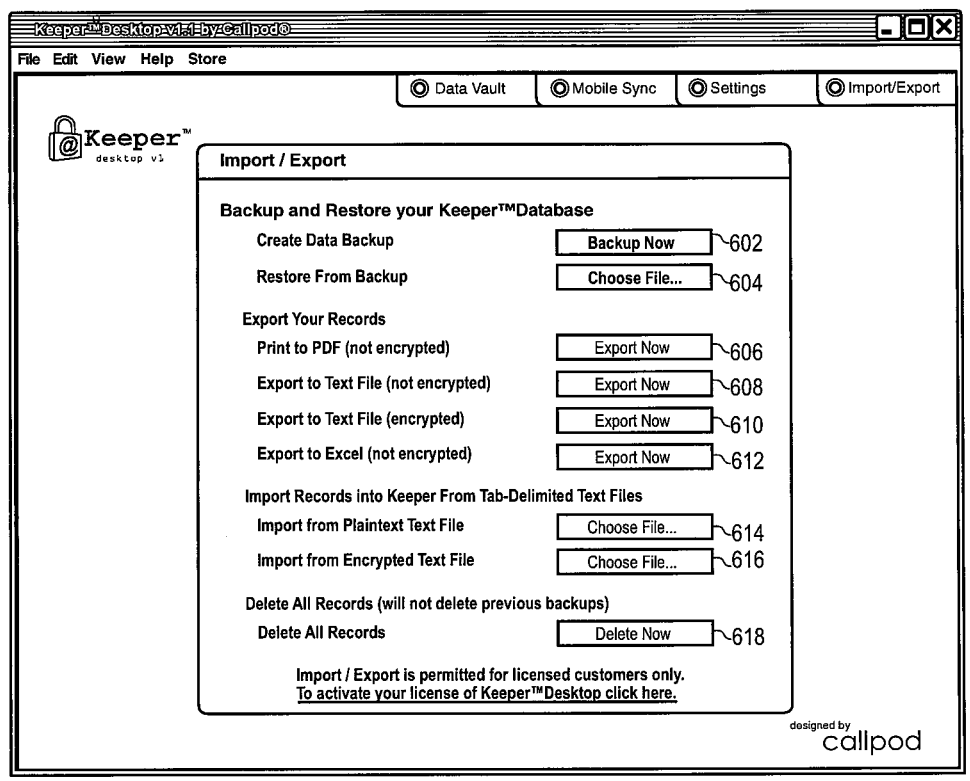
FIG. 7 is an Import/Export screen that may be selected by a user through the screens of FIGS. 3-6.

In addition to synchronizing files 24, 26, the user may also archive the files 24, 26. In this case, the user may activate an Import/Export softkey 222 (FIG. 3). In response, the screen of FIG. 7 may be presented to the user.

If the user has not previously backed up the files, then the user may activate the Backup Now softkey 602. In response, the user would be presented with a proposed path/file name for backup. The user may either activate an OK softkey or modify the proposed path/file name and then activate the OK softkey to complete the backup.

Alternatively, the user may restore a previous set of files 24, 26 by activating a Choose File softkey 604. In response, the user may be presented with one or more previously created backup file(s). The user may select one of the files followed by activation of an OK softkey completing the restore operation.

The user may also export the files 24, 26 either in an encrypted on unencrypted format. For example, a user may export the files 24, 26 under an unencrypted pdf format by activating an Export Now softkey 606. In response, the user would be presented with an interactive window for entry of a path/filename. The user may select a path, enter a file name and activate an OK softkey to complete exportation into the unencrypted pdf file.

Similarly, the user may export the files 24, 26 under an unencrypted text format by activating an Export Now softkey 608. In response, the user would be presented with an interactive window for entry of a path/filename. The user may select a path, enter a file name and activate an OK softkey to complete exportation into the unencrypted text file.

Alternatively, the user may export the files 24, 26 under an encrypted text format by activating an Export Now softkey 610. In response, the user would be presented with an interactive window for entry of a path/filename. The user may select a path, enter a file name and activate an OK softkey to complete exportation into the encrypted text file.

In another alternative, the user may export the files 24, 26 under an unencrypted Excel format by activating an Export Now softkey 612. In response, the user would be presented with an interactive window for entry of a path/filename. The user may select a path, enter a file name and activate an OK softkey to complete exportation into the unencrypted Excel file.

The user may also import files from one or more tab-delimited text files having the appropriate format. In this case, the user may import from a plaintext text file by activating a Choose File softkey 614. In response, the user would be presented with a Browse softkey where the user would select the appropriate text file. The user may then activate an OK softkey to complete the importation.

The user may also import files from one or more text files having the appropriate encrypted format. In this case, the user may import from an encrypted plaintext text file by activating a Choose File softkey 616. In response, the user would be presented with a Browse softkey where the user would select the appropriate encrypted text file. The user may then activate an OK softkey to complete the importation.

The user may also delete all files 24, 26 within the system 10 by activating the Delete Now softkey 618. Activation of this softkey 618 will not affect previous backups of the files 24, 26.

Under another illustrated embodiment, the system 10 includes (or accesses) a global positioning system (UPS) sensor 38. Each time that the user opens a particular file 24, 26, the GPS sensor 38 may determine a current global position (e.g., by street address, latitude and longitude, etc.) of the device 12, 32 and a global positioning processor 40 saves the global position within the file 24, 26. If the file 24, 26 already contains a record of the current global position, then the global positioning processor may increment the number of times that the file 24, 26 has been opened at the current position. Alternatively, a user may activate a Mark Global Position softkey 44 to mark a particular location of use of the file 24, 26.

The collection of geographic information may be very useful in some situations. For example, where a user enters a bank or stock broker's office, it is very likely that the user will need access to any files 24, 26 containing secret information related to one or more accounts the user has previously established with the bank or broker.

Operating in the background on the system 10 may be a position comparison processor 42 that determines a current global position of the system 10 each time that the user logs into the system 10 or periodically after login. A comparator within the position comparison processor 42 then looks for any marked files 24, 26 or compares the current global position with any global positions saved within each of the files 24, 26 to identify any files 24, 26 that are frequently used at the current geographic location. The position comparison processor 42 may do this by comparing the number of times that a file was opened at a current location with a threshold value used to eliminate random events. The position comparison processor 42 may then order any remaining files based upon which file 24, 26 was opened most frequently at the current location and proceed to present the ordered list to the user. The user may open the most frequently used file 24, 26, scroll through the list or open none at all.

In general, the system 10 operates substantially the same on the mobile unit 32 as on the laptop or desktop device 12. One exception is the graphical user interface (GUI) 14. For example, where the system 10 is installed into an iPhone, the GUI 36 of the mobile unit 32 would appear somewhat different than when used on the laptop 12.

Figure 8:
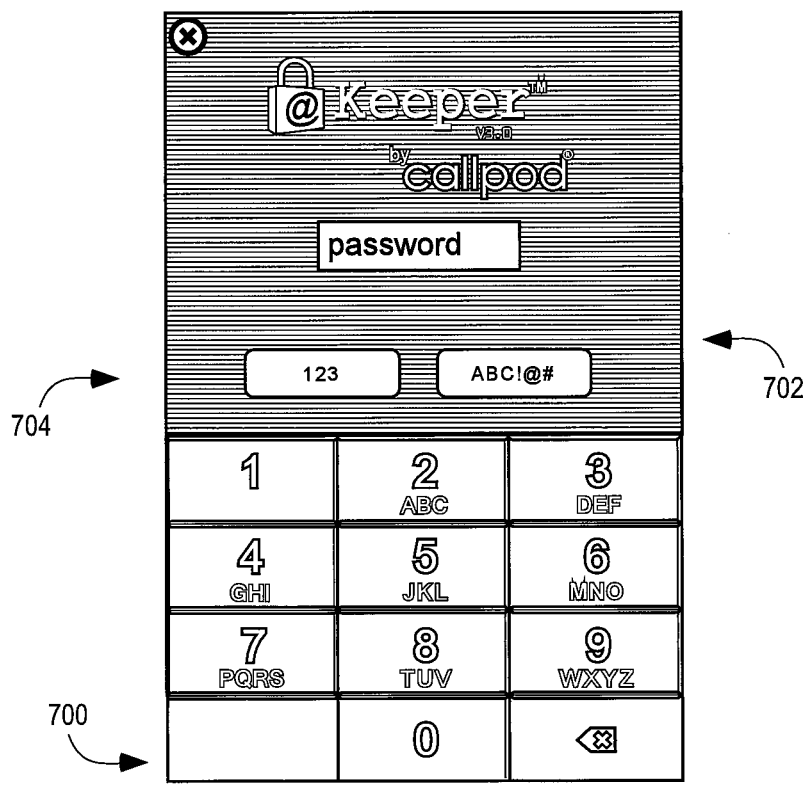
FIG. 8 is a master password entry screen of a portable device that may be used by the system of FIG. 1.

For example, to access the system 10, the user would activate the password protection system icon 16 on the mobile device 32. In response, the login screen 700 of FIG. 8 would appear on the GUI 36 of the mobile device 32.

Using the screen 700, the user would log into the system 10. For a master password including numbers, the user would activate the number softkey 704 for entering numbers. For letters, the user would activate the alphabetic softkey 702 and be presented with a full alphabetic keyboard instead of the number keyboard shown on screen 700.

Figure 9:
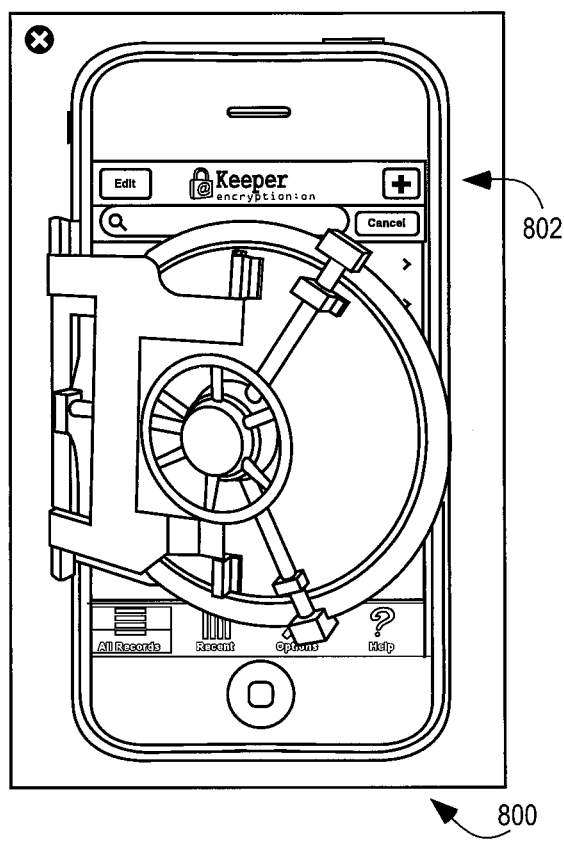
FIG. 9 is an introductory title list screen of a portable device that may be used with the system of FIG. 1.

Upon the successful entry of a master password, the screen 800 of FIG. 9 would appear on the mobile device 32. In order to access the records 24, 26, the user may activate an advance softkey 802.

Figure 10:
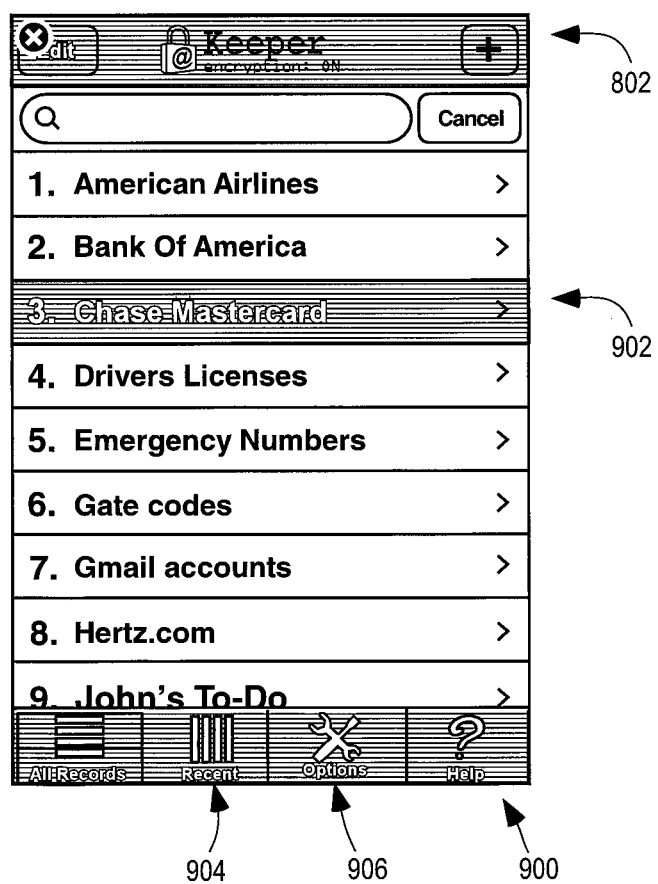
FIG. 10 is a selection list screen of confidential information of a portable device that may be displayed by the system of FIG. 1.

Upon activating the advance softkey 802, the user may be presented with the screen 900 of FIG. 10 showing a list of titles 202. If the user does not see the title that he/she wants, then the user may continue to activate the advance softkey 802. Alternatively, the user may activate a most recently accessed softkey 904 to view a set of most recently displayed records 24, 26.

Figure 11:
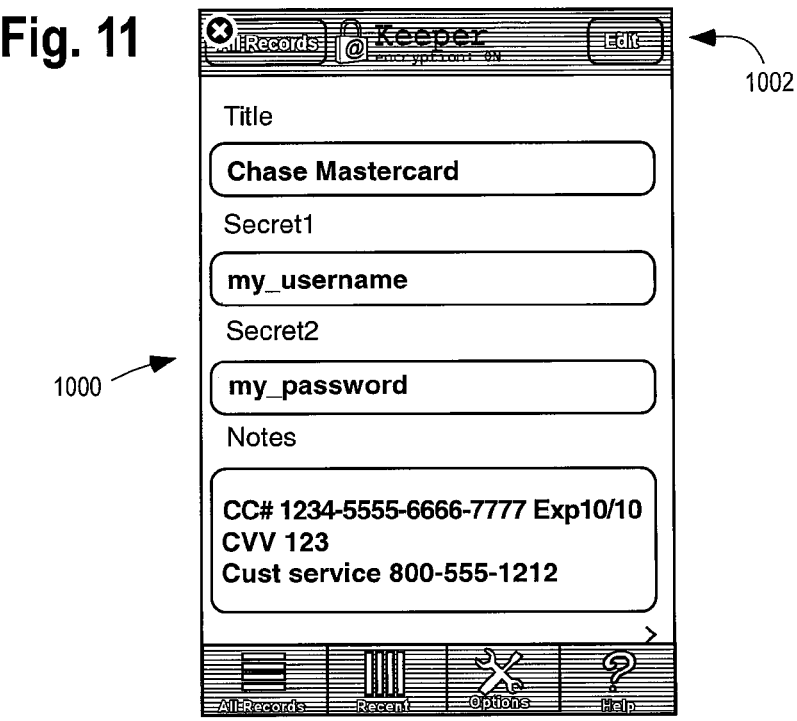
FIG. 11 is an information screen of a portable device that may be selected through the screen of FIG. 10.

Alternatively, the user may select one of the titles (e.g., title 902 of FIG. 10). Upon activating the title 902, the user would be taken to the screen 1000 of FIG. 11.

The user may review and use the information on the screen 1000 or may decide that the information needs to be updated. If the user desires to update the screen 1000, then the user activates the Edit softkey 1002 and is taken to the screen 1100 of FIG. 12.

Figure 12:
FIG. 12 is an edit screen that may be selected through the screen of FIG. 11.

On the screen 1100 of FIG. 12, the user may place a cursor 1102 where ever desired and make corrections. Once the corrections are complete, the user may activate the Save softkey 1104. Alternatively, the user may activate the Cancel softkey 1106 or Close softkey 1108 to cancel the corrections. If the user activates the Close softkey 1108, then the system 10 would close and the user would be required to activate the system icon 16 to login and continue use of the system 10.

Figure 13:
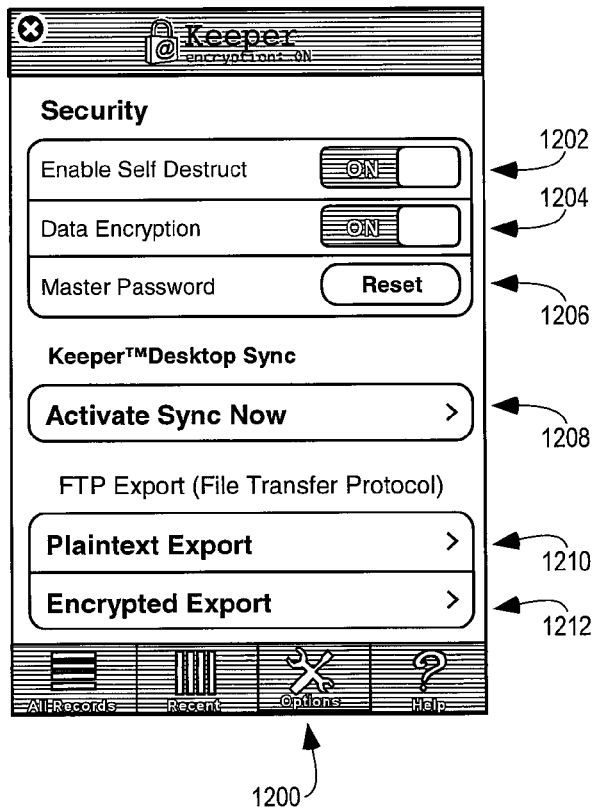
FIG. 13 is a synchronization screen that may be selected through the screens of FIGS. 9-12.

If the user chooses to activate the Save softkey 1104 or Cancel softkey 1106, then the user may be taken back to the title list of screen 900. From the title list of screen 900, the user may activate an Options softkey 906 and be presented with the tools screen 1200 of FIG. 13.

On the tools screen 1200, the user may activate the Enable Self Destruct softkey switch 1202 to enable the automatic deletion of records 24, 26 upon the entry of a sequence of incorrect master password a predetermined number of times. Alternatively, the user may activate a Data Encryption softkey switch 1204 to encrypt the files 24, 26 and master password saved on the mobile device 32. The user may also activate a Master Password Reset softkey 1206 to reset the master password.

The user may also initiate a synchronization procedure through the Activate Sync Now softkey 1208. The user may also specify the format of synchronization by selecting either a Plaintext Export softkey 1210 or a Encrypted Export softkey 1212.

If the user activates the Activate Sync Now softkey 1208, the user may be asked to activate a further softkey switch to confirm his/her desire to synchronize with the laptop 12. If the user confirms, his/her desire to continue, then the mobile device presents an address for use with and entry into the laptop in order to facilitate synchronization. Once complete, the mobile device presents a screen to the user confirming the successful synchronization of the mobile device 32.

In another embodiment of the invention, the password processor 18 may compare any entered password with a booby trap password 46. The use of a booby trap password 46 may be useful in cases where the user of the system is under duress. For example, a user on a public street may be threatened with harm if the user does not provide a thief with the master password. In this case, the booby trap password 46 may be a password that instead of providing access to the files operates to immediately delete the files 20, 26.

As above, the booby trap password 46 may be encrypted using a public key and the booby trap password 46 and saved as an encrypted booby trap file 48. Any entered password may be used to decrypt the file 48. If the entered password successfully decrypts the file 48, the deletion processor 28 may be immediately activated to delete the files 24, 26.

In still another embodiment, the successful decryption of the booby trap file 50 may result in a series of steps intended to confound a threat. In this case, the successful decryption of the booby trap file 48 may cause a set of bogus information from a file 50 to be displayed on the screen including a set of bogus passwords or passwords that if used by the threat would immediately cause an alert to be sent to the authorities.

Figure 14:
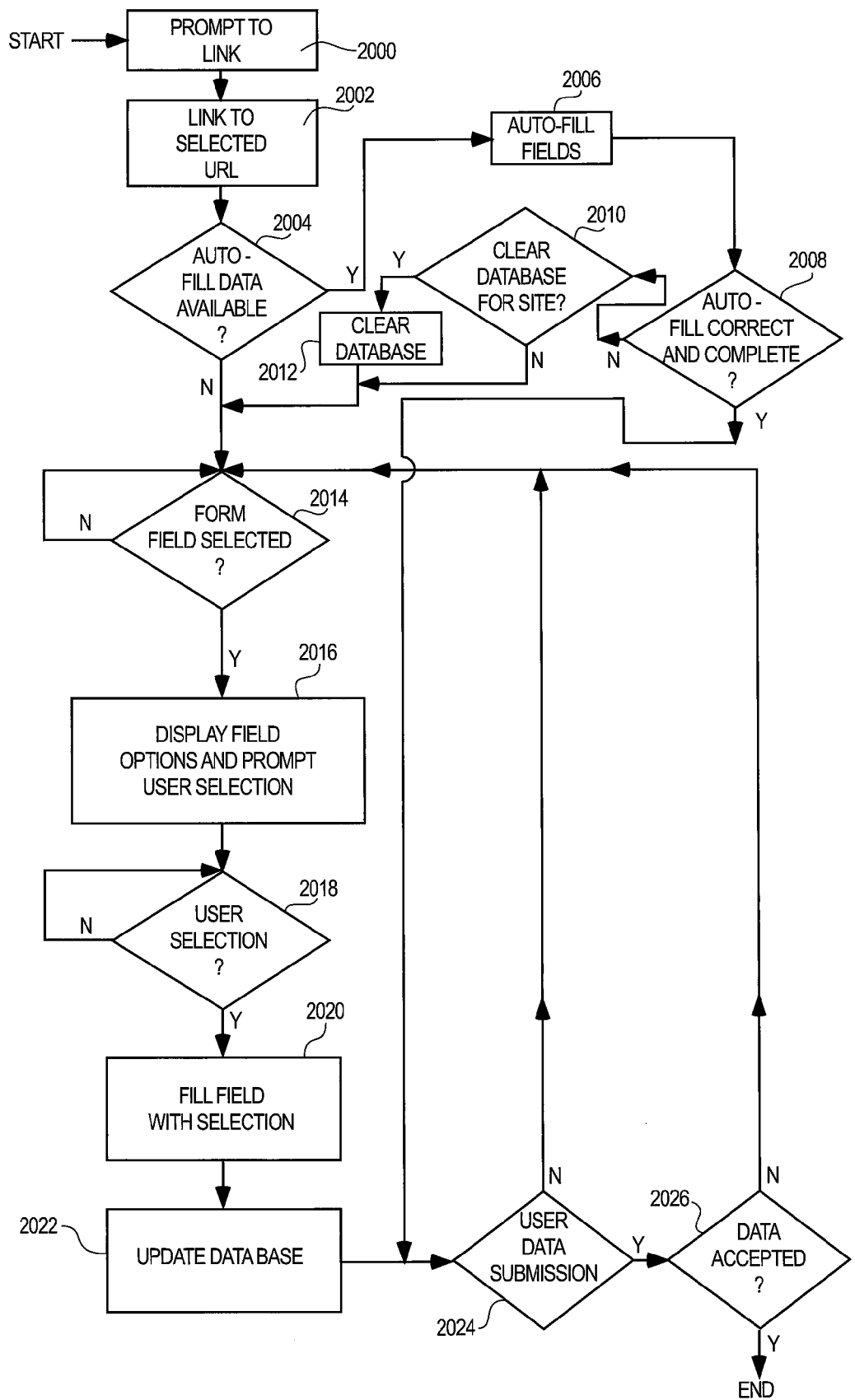
FIG. 14 is a flowchart illustrating optional programming executed by the password protection system 10 according to a further embodiment of the present invention.
Figure 14A:
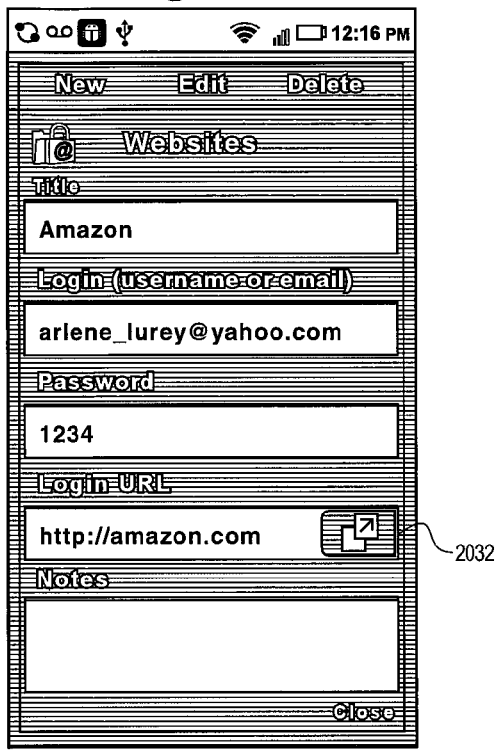
FIGS. 14A-14C are screenshots of screens presented to a user associated with the programming of FIG. 14.

FIG. 14 illustrates programming that may be executed by the system 10 to implement an auto-fill function. When a user creates a password record using the system 10, one of the fields that the user can fill in is called the "link" field. This link is a URL of the website for which the password was created. For example, it could be their banking website (e.g., http://www.bankofamerica.com) or shopping site (such as_http://www.amazon.com).

When the user views his/her password record, he/she is prompted with the ability to open the displayed link on a web browser of their device. When the browser opens, the system 10 scans the content of the pages as the user navigates. When the user selects a form field (e.g., a username, password, or email box) of the website's page, the system 10 prompts the user to indicate whether the system 10 should automatically fill in the field. The user is prompted with options of what to insert (i.e. username, password, email, or other field) and the user selects one of the proffered options. The system 10 fills in the form field in response to the selection. The user repeats this process until all the form fields are filled out satisfactorily and the user submits the form to the website, hence performing a login or other action.

The system 10 remembers which fields of the system database were utilized for which website fields. The next time the user launches the website from the system 10, the system 10 auto-fills the information, thereby allowing the user to quickly log into the particular site. The user may also clear the mappings if the site has changed or new fields are required.

Figure 14B:
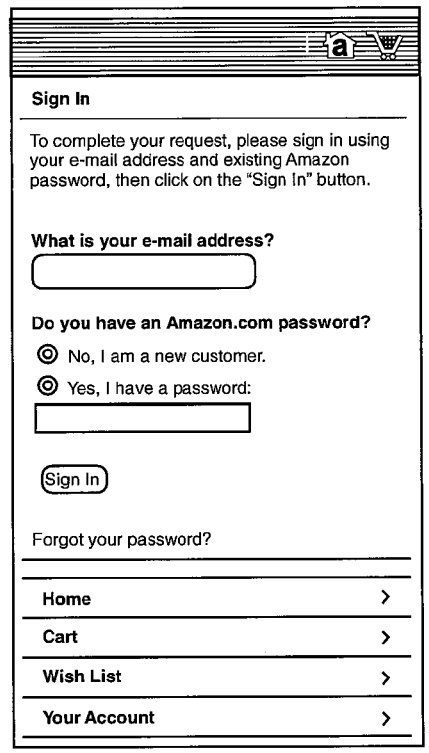
Figure 14C:
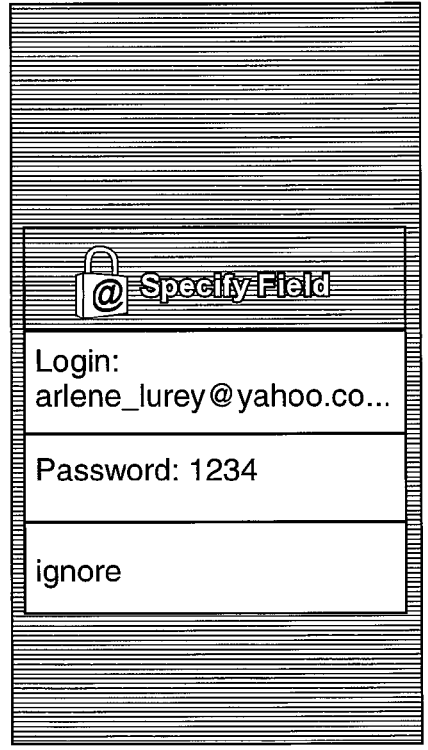

Referring to FIG. 14, the programming begins at a block 2000 that prompts the user to select the link associated with the record that is currently being viewed. Once the user has selected the link, a block 2002 causes the browser to link to the selected URL. For example, a screen 2030 is presented to the user, which includes a soft key 2032 that, when selected, activates the block 2002, which then causes the web site to be presented to the user on screen 2034, as shown in FIG. 14B. At this point the system 10 continues to run in the background although the web site is also shown on the screen 2034. A block 2004 then determines whether data are available in the database of the system 10 to perform the auto-fill function. If such data are available, a block 2006 performs the auto-fill function whereby database entries are correspondingly loaded into website form fields, as shown in screenshot 2036 of FIG. 14C. A block 2008 then checks to determine whether the auto-fill operation has resulted in a correct and completed website page. If this is not found to be the case, a block 2010 queries the user to determine whether the database entries associated with the site should be cleared from the database. If the user responds that the database data should be cleared from the system 10, a block 2012 deletes the entries in the database record and control passes to a block 2014. On the other hand, if the block 2010 determines that the user desires not to clear the data in the database, the block 2012 is skipped.

Following the block 2004 or the blocks 2010 or 2012, the block 2014 checks to determine whether the user has selected a field on the website form. If this is not found to be the case, control pauses until a field is selected. Once this is detected, a block 2016 displays options for the field and prompts the user to select one of the options. Control then pauses at a block 2018 until the user selects one of the options for insertion. A block 2020 then fills the selected field with data representing the selected option. Thereafter, a block 2022 updates the system database with the selected option data and associates such data with the form fields at which the data were inserted.

Following the block 2022, a block 2024 checks to determine whether the user has activated a data submission softkey requesting that the filled-in form be submitted to the website. Ordinarily, this action would not be requested until all form fields have been filled in successfully. If the user has not pressed the submission softkey, control returns to the block 2014 where the user can select a new form field. On the other hand, if the user has pressed the submission softkey, the data in the form fields are submitted to the website. A block 2026 thereafter checks to determine whether the website has accepted the filled-in webpage. If this is not found to be the case, control returns to the block 2014 so that the user may enter more data. If the filled-in webpage has been accepted by the website, this portion of the programming terminates.

Figure 15:
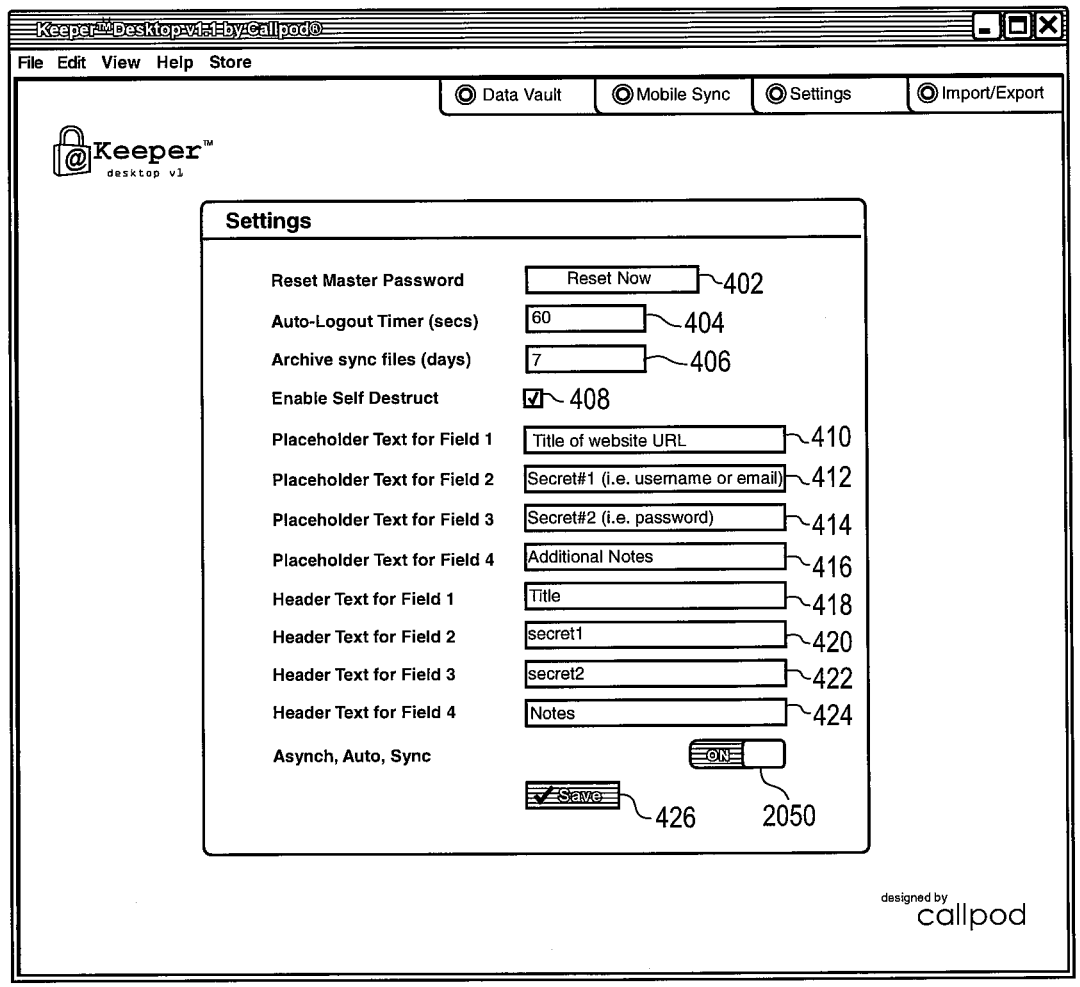
FIG. 15 is an alternative settings screen similar to FIG. 5 that permits selection of settings, including an asynchronous auto-sync function, for the system of FIG. 1.

FIG. 15 illustrates an alternative settings screen that can permit a user to select or deselect an asynchronous auto synchronization function. In general, a user requires his/her password information to be available and accessible on any computer or mobile device that he/she utilizes. The information must be kept up-to-date and in sync whenever the user changes or adds new information on any device. When a user signs up with the system 10, the user is provided a "subscription code," which is a unique alphanumeric sequence that only applies to the user. This code is typed into each location that the software is installed along with a device id that uniquely identifies each device on which the system 10 is installed. When validated by the activation server, this information uniquely defines a user and a device.

The process of automatically synchronizing the user's password information should be kept simple and easy, and therefore, there should not be any configuration or complex device authentication.

An on/off switch 2050, seen in FIG. 15, is optionally provided to the user on the Settings screen of the application. This switch, when turned ON, will cause the application to contact a database of a central server where an encrypted copy of the user's data is uploaded upon every instance of the application opening, or on a periodicity defined by the user. The data are encrypted utilizing the user's master password and subscription code as the cipher. Using this cipher ensures that a brute force attack on the data is not feasible.

When the data are uploaded to the central server, a synchronization operation is performed on the server side, based on the previously uploaded data having the same subscription code and cipher keys (if such data exists). The resulting database is then downloaded by the user's application and overrides the user's current database. By maintaining a copy of the most recently merged database on the server side, the user is able to perform asynchronous auto-sync of his/her information across mobile devices and computer(s).

It should be noted that a synchronization operation can not take place if the subscription code and master password do not form a cipher that properly decrypts the data.

Figure 15A:
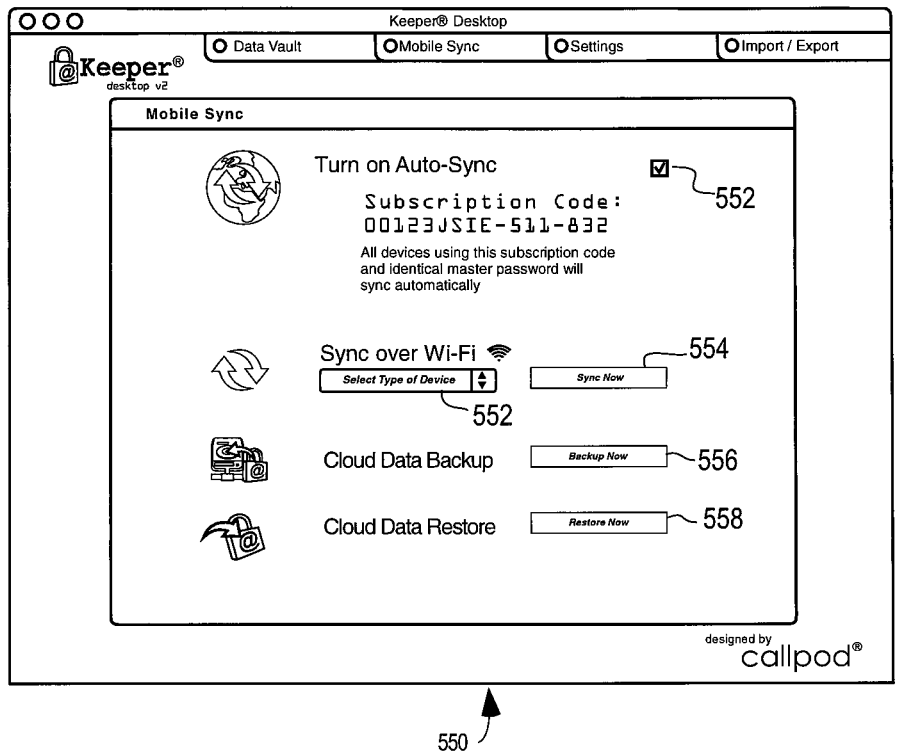
FIGS. 15A-15H are screen shots of alternative screens presented to user for an alternative method of implementing synchronization and database backup routines.
Figure 15B:
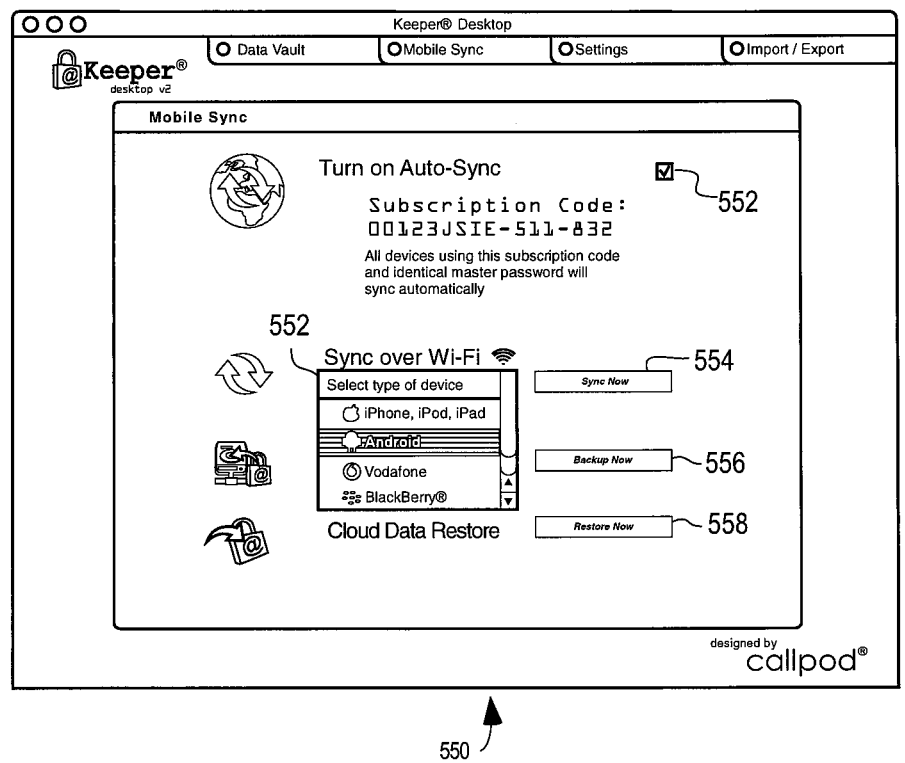

In another embodiment of such a server-based system, synchronization and data backup routines may also be accessed with a screen 550 shown in FIGS. 15A and 15B may be presented to the user as an alternative to the screen 400 shown in FIG. 15 or the screen 500 in FIG. 6.

In this embodiment, any one of the electronic devices may automatically synch with the other electronic devices via the remote server. An on/off check box 552 is displayed on the screen 550, wherein if the checkbox is selected "on," then the system will automatically synchronized the data stored on each electronic device connected to the remote server when a given event occurs. For example, the auto synchronization may be set to occur any time new data is entered into a database and any time existing data is modified on a database on any one of the electronic devices, and/or whenever the system 10 is accessed. Thereby, if a file record 24, 26 is created or altered on one electronic device, then that electronic device will send the new/altered information to the server, which will in turn relay the new/altered information to some or all of the other electronic devices.

The electronic devices may also be synchronized manually over a local area network, such as a local wi-fi network. Manual synchronization may be initiated with a dropdown menu 652 associated with a softkey 654 for accessing a synchronization routine. As shown in FIG. 15B, the dropdown menu presents a list of choices of what type of device the user wishes to synchronize with. For example, the user may choose to synchronize with an Android-type of smart phone as shown in FIG. 15B. Of, the user could choose other types of electronic devices depending upon what types of devices with which he or she needs to synchronize. Additionally, manual synchronization may optionally be directed to a particular one of several different electronic devices, in which case an additional data entry feature may be provided to the user to provide identifying information for which of the several electronic devices he or she wants to synchronize. After the device has been selected and/or identified, the user selects the softkey 554 to initiate a synchronization routine over the LAN.

Such a server-based system may also include data backup and restore features that backup to and restore from the remote server, wherein file records 24, 26 on an electronic device are backed up by copying the file records to memory on the remote server and such backed-up file records may be restored to any one of the electronic devices. Such back-up and restore functionality to a remote server may be called cloud data backup and cloud data restore. A softkey 556 initiates a cloud backup routine, and a softkey 558 initiates a cloud restoration routine.

Figure 15C:
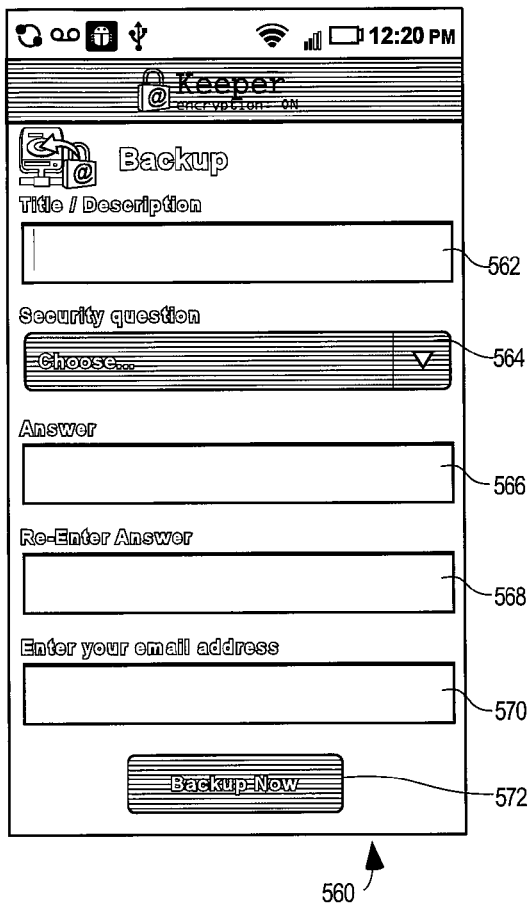

Upon selecting the softkey 556, a screen 560 (FIG. 15C) is presented to the user. The user enters a title for a backup file to be created in a data entry box 562, such as "phone." The user selects a security question from a dropdown box 564. For example, the security question may be "what is the current keeper master password?" The user enters the answer to the security question in a data entry box 566, and re-enters the answer in the data entry box 568 for confirmation. The user also enters his or her email address in the data entry box 570. Thereafter, the user selects a softkey 572 to initiate the cloud backup routine, which creates and stores an encrypted backup file on the remote server under the title entered by the user in the data entry box 562. The backup file is encrypted utilizing a cipher based on the email address, the security question, and the security answer entered by the user. This prevents unauthorized access to the backup file by anyone.

Figure 15D:
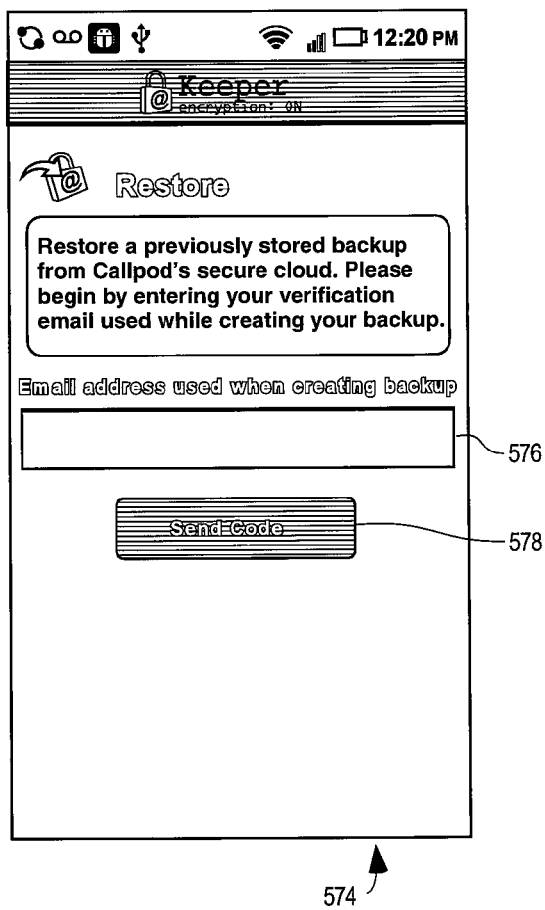
Figure 15E:
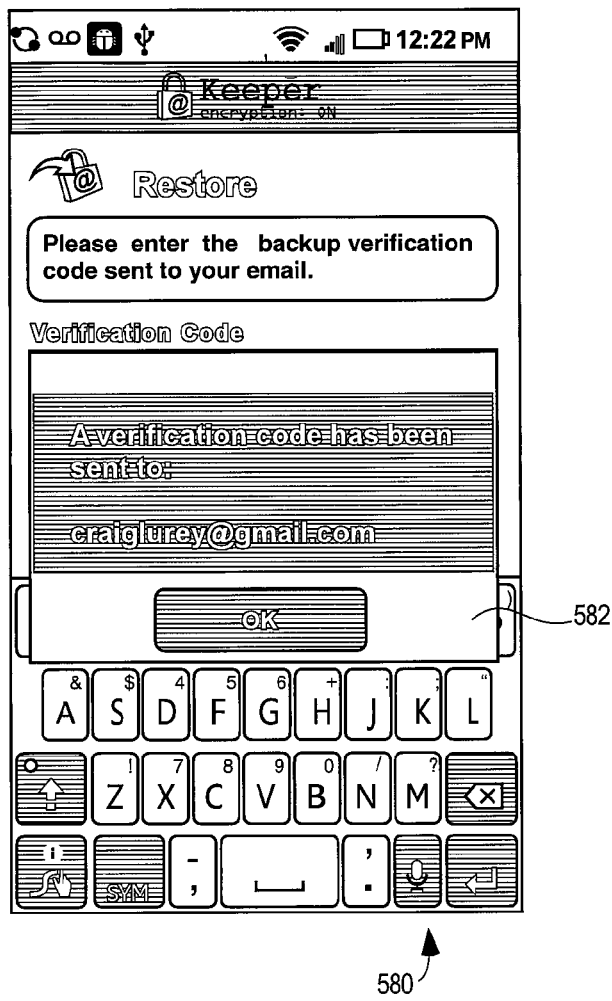
Figure 15F:
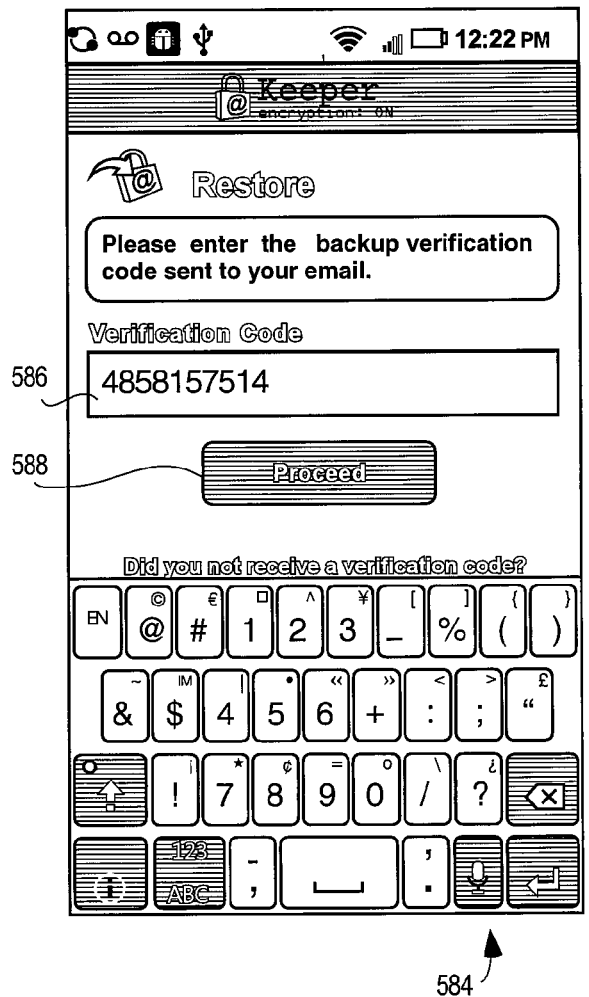
Figure 15G:
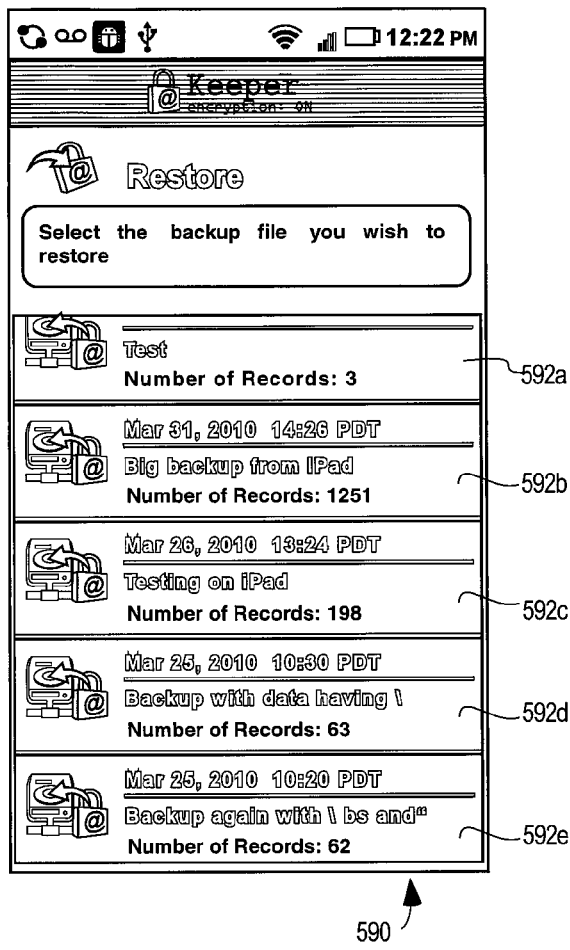
Figure 15H:
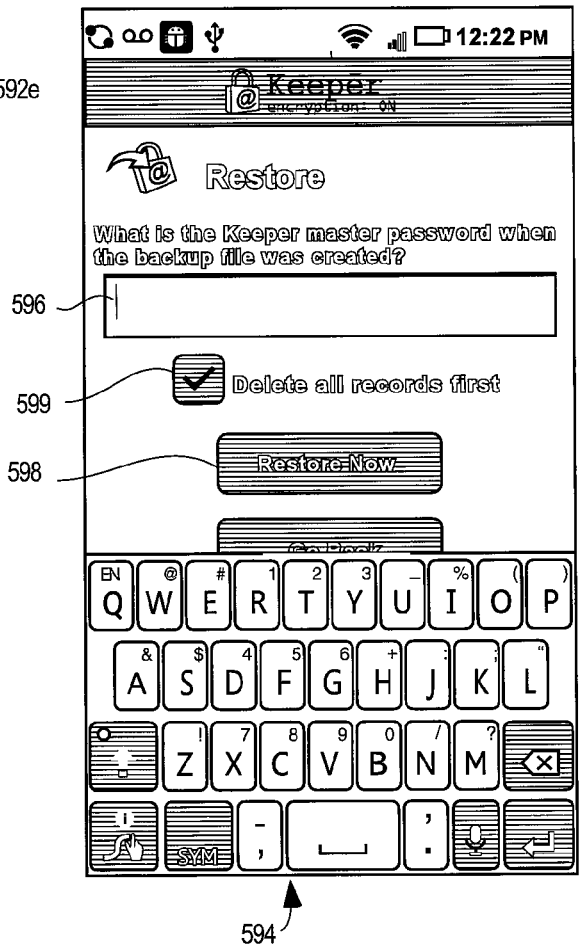

To restore data to one of the electronic devices from the remote server, the user initiates the cloud data restore routine by selecting softkey 558, whereupon a screen 574 (FIG. 15D) is presented to the user. The user enters the same email address in the data entry box 576 that was previously entered in the data entry box 570 when creating the backup file. The user then activates softkey 578. If the email address entered in the data entry box 576 matches the email address entered in the data entry box 570, then the remote server sends a verification code to the email address, which is reported to the user in screen 580 (FIG. 15E). If the email addresses entered in data entry boxes 570 and 576 do not match, no verification code is sent. The user then selects an acknowledgment softkey 582, and a screen 584 (FIG. 15F) is presented to the user. The user retrieves the verification code from his or her email account and then enters the verification code into a data entry box and submits the verification code to the remote server by activating softkey 588. If the verification code entered into data entry box 586 matches the verification code sent by the remote server, then a screen 590 (FIG. 15G) is presented to the user, which shows a list of backup files associated with the user 592a, 592b, 592c, 592d, 592e. The user selects the backup file he or she wishes to restore to the electronic device and a screen 594 (FIG. 15H) is presented, which presents to the user the security question selected at dropdown menu 564 selected when creating the backup file 592a, 592b, etc. selected. The user enters the answer to the question in a data entry box 596 and sends the answer to the remote server by selecting the softkey 598. If the email entered in the data entry box 576, the verification code entered in the data entry box 586, and the answer entered into the data entry box 596 all match the corresponding prior data, then the remote server creates a decryption key, which is used to decrypt the backup file, and transmits the decrypted backup file to the electronic device over a secure communication channel. The backup file is then written to the electronic device, and then re-encrypted on the portable electronic device with the master password. The user may optionally choose to delete all records 24, 26 already on the electronic device before the backup file is written to the electronic device by selecting an on/off box 599.

Figure 16:
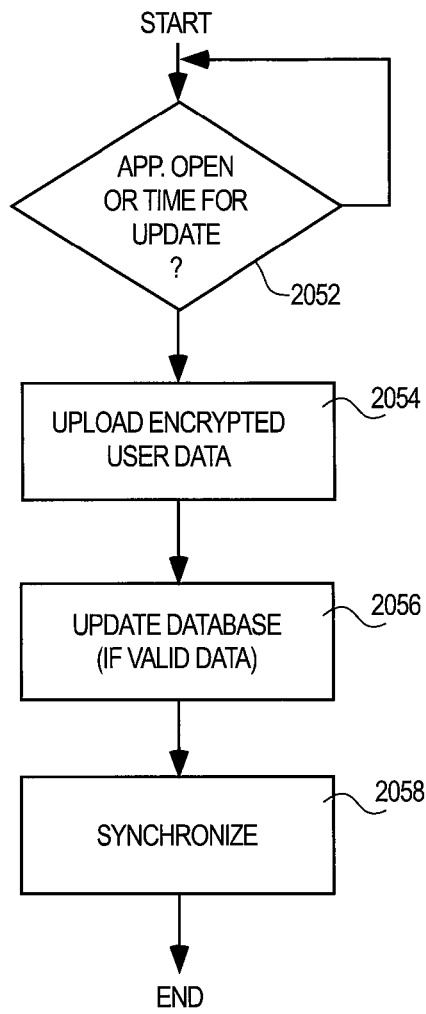
FIG. 16 is a flowchart of programming executed by the system of FIG. 1 to implement the asynchronous auto-sync operation.

Referring next to FIG. 16, the programming to implement the asynchronous auto synchronization begins at a block 2052, which checks to determine whether the application has been newly opened or, optionally, whether a particular time has elapsed from the last synchronization operation. If neither event has occurred, control pauses at the block 2052; otherwise, control passes to a block 2054 that uploads the encrypted user data to the central server. The server checks the uploaded data to determine if such data are valid and, if so, the fields of the database maintained on the central server are updated for the particular records where data has changed since the last synchronization operation. A black 2058 then synchronizes remaining devices associated with the particular user.

Figure 17:
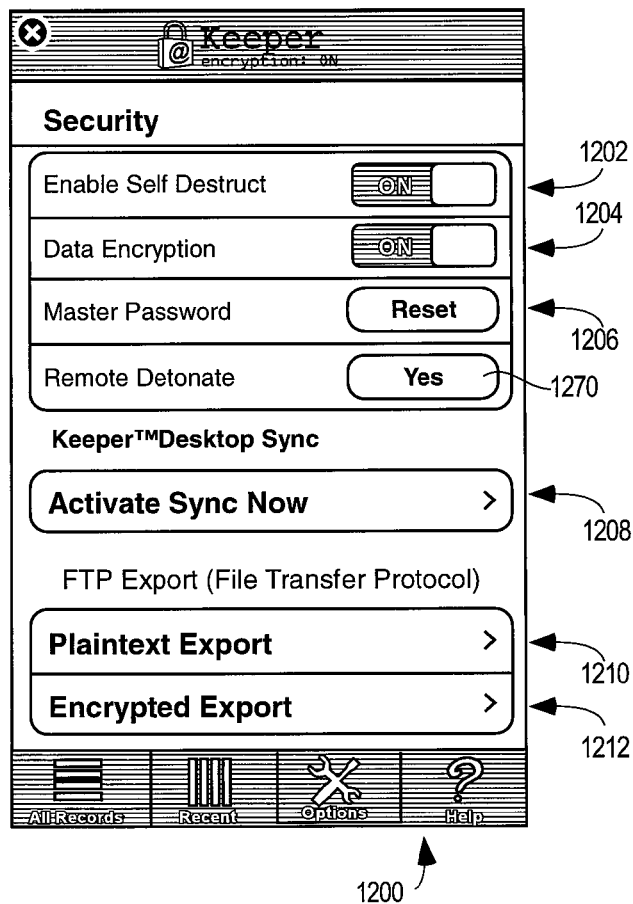
FIG. 17 is a synchronization screen similar to FIG. 13 that permits a user to request deletion of records on a lost or stolen device.

Referring next to FIG. 17, in the case of device theft or a lost device, or if the user operating the device is not authorized to have the information stored in his/her application, the owner of the application (and also the owner of the "subscription code") has the ability to issue a remote detonation of the mobile database or individual records stored in that database. When the application begins execution, a request is sent to the central server together with the active subscription code. If a remote detonation of data is requested by actuating a softkey 2070, the server will respond with the command to "detonate" and optionally provide a list of records to delete. The application will automatically perform this detonation upon request.

Figure 18:
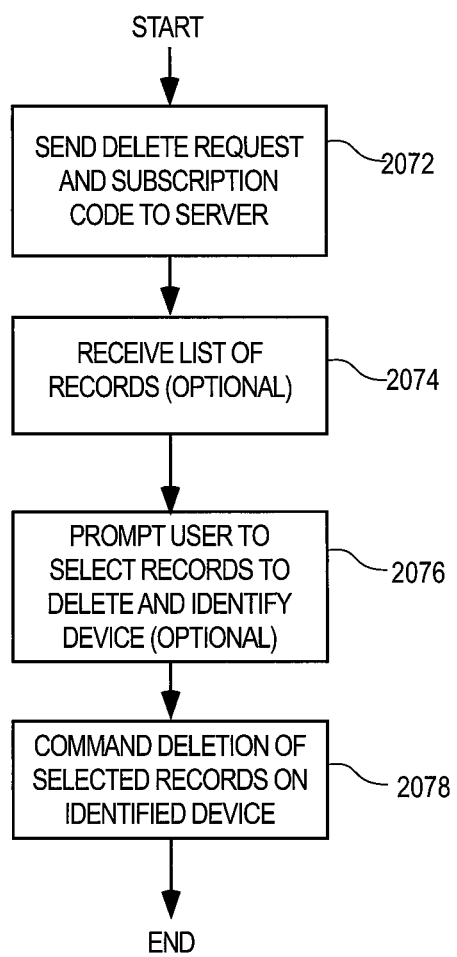
FIG. 18 is a flowchart of programming responsive to actuation of a softkey of FIG. 17 to delete selected records on a lost or stolen device.

More specifically, once the remote detonate softkey 2070 has been actuated, the software of FIG. 18 is executed by the system 10 (here shown as being initiated from the mobile device). The software begins at a block 2072, which sends the detonation request and subscription code and device ID to the central server. (Note—see the question above regarding the device ID) Following the block 2072, a block 2074 may receive an optional list of all records that may be marked for deletion on the lost or stolen device. A further block 2076 may optionally prompt the user to select records to delete and may further prompt the user to identify the device that has been lost or stolen, if such device has not been previously identified at the block 2072. A block 2078 then commands the deletion of selected records on the identified device via the central server.

Figure 19:
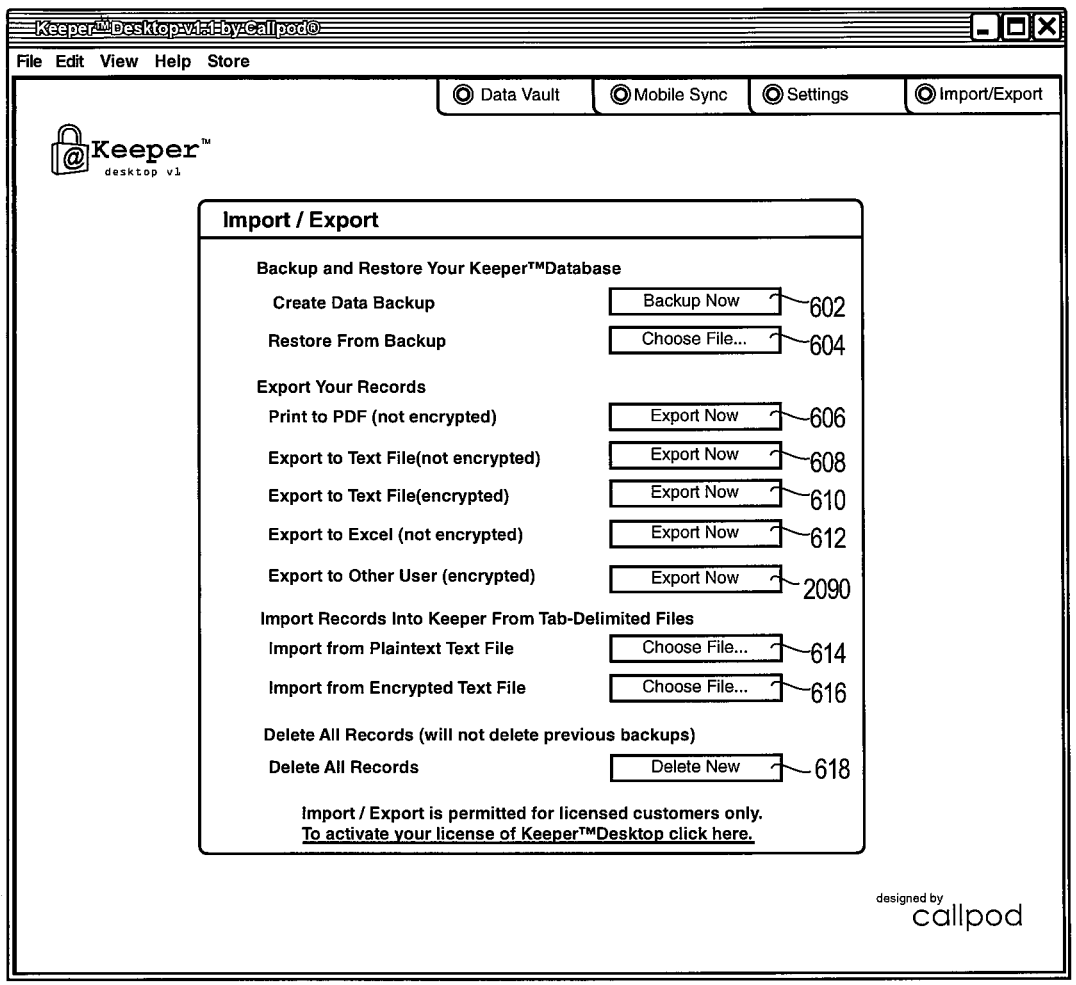
FIG. 19 is an Import/Export screen similar to FIG. 7 that permits a user to request transmission of selected records to another user.
Figure 20:
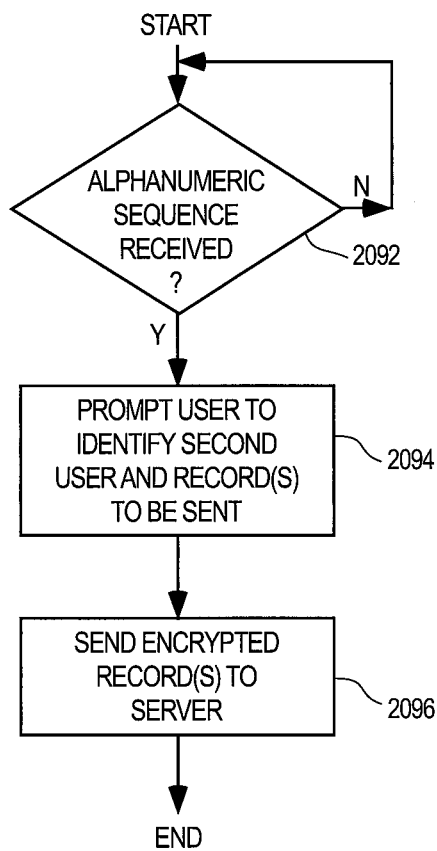
FIG. 20 is a flowchart of programming executed by the system of FIG. 1 in response to actuation of a softkey of FIG. 19 that transmits records to a second user.

Referring next to FIG. 19, in order to share password records between users, for example, between husband and wife or employees at a company, a mechanism for transmitting this password data in a secure and timely fashion is required. Additionally, in order for this feature to be used without burden, the feature needs to be simple and easy to use with minimal clicks. This may be accomplished, for example, by actuating a softkey 2090 in the Import/Export screen of the application that permits a first user to request the transmission of a record. The central server provides the user with a unique alphanumeric sequence of sufficient character length and a number of seconds for which the sequence will be valid (e.g., 60 seconds). Referring also to FIG. 20, programming executed by the application running on the first user's device begins at a block 2092, which awaits receipt of a unique alphanumeric sequence from the central server. Once this sequence is received, a block 2094 prompts the first user to identify a second user and record(s) to be sent to the second user. A block 2096 then encrypts the information to be sent with a cipher generated from the unique sequence and transmits the encrypted data to the central server.

Figure 21:
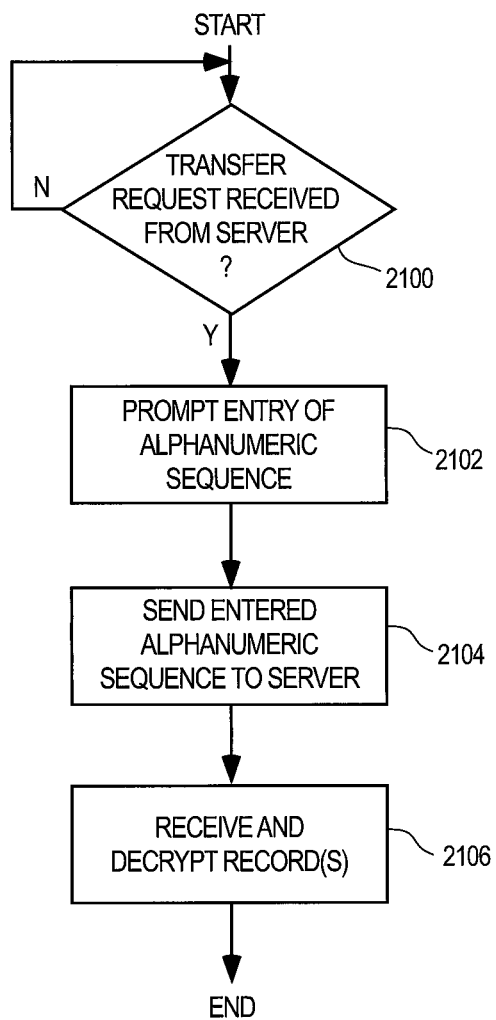
FIG. 21 is a flowchart of programming that may be executed by the system of FIG. 1 operating on a second user's device that permits the second user to receive records from the first user.

The first user provides the unique alphanumeric sequence to the second user via telephone or text message. Referring to FIG. 21, which illustrates programming executed by the application running on the second user's device, a block 2100 checks to determine whether a transfer request has been received from the central server. Once this occurs, a block 2102 prompts the second user to type in the unique alphanumeric sequence or accept the text message (SMS) into the second user's application, which enters the sequence on behalf of the second user. The sequence is then transmitted to the central server by a block 2104. Thus, the application on the second user's device requests access from the central server to any information associated with the given sequence. If the information is found, and if the second user has requested the information within the time period allocated, the information is delivered to the second user in encrypted format. A block 2106 decrypts the record with the key as the cipher.

This method protects from brute force attack in addition to the cipher strength of the encryption/decryption algorithm chosen.

A specific embodiment of method and apparatus for protecting confidential information has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

We claim:

1. A method implemented by a programmed processor coupled to a display, the method comprising the steps of:
   causing the display to present a first screen including a first key, a second key, and a plurality of third keys, wherein each third key represents an associated one of a plurality of stored files, wherein at least one file includes title information and an item of confidential information comprising access protected account information and an access password for accessing the account information;
   causing the display to present a second screen in response to actuation of the first key of the first screen wherein the second screen includes a first blank field for receiving additional title information, a second blank field for receiving an item of additional confidential information related to the additional title information, and a fourth key;
   storing the additional title information and the additional confidential information as an additional file in response to actuation of the fourth key of the second screen;
   causing the display to present a third screen in response to actuation of a selected one of the third keys and the second key of the first screen, wherein the third screen includes editable fields containing the title information and the item of confidential information of a particular stored file associated with the selected third key, and wherein the third screen includes a fifth key;
   storing contents of the editable fields in the particular stored file in response to actuation of the fifth key;
   associating a geographical location with the particular stored file upon receiving the third key selection that causes a tracked frequency of selecting the third key associated with the particular stored file to match a predetermined threshold value, wherein associating the geographic location includes activating a geographic location select function configured to compare the tracked frequency with the predetermined threshold value and enabling an opening of the particular stored file at a current geographical location that is substantially the same as the geographic location when and after the tracked frequency has matched the predetermined threshold value; and
   password protecting access to the stored files with a master password.

2. The method of claim 1, wherein the title information of one of the stored files represents a name of a credit provider associated with the private account information.

3. The method of claim 1, wherein the second screen further includes a third blank field for receiving a URL address associated with the confidential information.

4. The method of claim 3, further comprising the step of automatically populating entry fields at a web site at the URL address with the protected account information and/or the access password.

5. The method of claim 1, wherein the processor is incorporated into a portable electronic device.

6. The method of claim 1, wherein the predetermined threshold value is used to eliminate random events.

7. The method of claim 6, including the further step of determining a geographic location of a person entering the master password.

8. The method of claim 7, further including the step of identifying a stored file with which a geographic location that matches the determined geographic location is associated.

9. The method of claim 8, further including the step of displaying data stored in the identified file.

10. The method of claim 1, further including the step of automatically synchronizing the stored files with a second set of files located on a remote processor when one or more pre-defined events occur with respect to the stored files.

11. The method of claim 1, further including the step of creating an encrypted copy of the stored files on a central server.

12. The method of claim 11, wherein the copy is encrypted using an email address, a security question, and an answer to the security question.

13. The method of claim 12, further including the steps of:
transmitting a decryption key to the central server;
decrypting the encrypted copy of the stored files with the decryption key;
transmitting the decrypted copy over a secure channel to a portable electronic device;
re-encrypting the decrypted copy on the portable electronic device with the master password.

14. An apparatus, comprising:
a display;
a password processor:
for causing the display to present a first screen including a first key, a second key, and a plurality of third keys, wherein each third key represents an associated one of a plurality of stored files wherein each file includes title information and an item of confidential information;
for causing the display to present a second screen in response to actuation of the first key of the first screen wherein the second screen includes a first blank field for receiving additional title information, a second blank field for receiving an item of additional confidential information related to the additional title information, and a fourth key;
for storing the additional title information and the additional confidential information as an additional file in response to actuation of the fourth key of the second screen;
for causing the display to present a third screen in response to actuation of a selected one of the third keys and the second screen of the first screen wherein the third screen includes editable fields containing the title information and the item of confidential information of a particular stored file associated with the selected third key, and wherein the third screen includes a fifth key;
for storing contents of the editable fields in the particular stored subject matter file in response to actuation of the fifth key;
for associating a geographical location with the particular stored file upon receiving the third key selection that causes a tracked frequency of selecting the third key associated with the particular stored file to match a predetermined threshold value, wherein associating the geographic location includes activating a geographic location select function configured to compare the tracked frequency with the predetermined threshold value and enabling an opening of the particular stored file at a current geographical location that is substantially the same as the geographic location when and after the tracked frequency has matched the predetermined threshold value; and
for password protecting access to the files.

15. The apparatus of claim 14, wherein a name of at least some of the plurality of stored files comprises a representation of a name of a credit provider.

16. The apparatus of claim 15, wherein a file of the plurality of stored files includes a representation of an account number.

17. The apparatus of claim 16, wherein the confidential information of one of the plurality of files comprises a password.

18. The apparatus of claim 17, wherein the apparatus is a portable electronic device.

19. The apparatus of claim 18, wherein associating the geographical location with the particular stored file is performed by a global position processor, and wherein the predetermined threshold value is used to eliminate random events.

20. The apparatus of claim 19, wherein the global position sensor is configured to determine the current geographic location of the portable electronic device, and a position comparison processor is coupled to the display for displaying the particular stored file with which the geographic location is associated when the current geographic location is substantially the same as the geographic location and when and after the tracked frequency has matched the predetermined threshold value.

21. The apparatus of claim 14, further comprising a booby trap password that causes immediate deletion of the plurality of files.

22. The apparatus of claim 21, further comprising a file of bogus information that is presented upon detection of the booby trap password.

* * * * *